United States Patent [19]
McAllister et al.

[11] Patent Number: 6,101,242
[45] Date of Patent: *Aug. 8, 2000

[54] MONITORING FOR KEY WORDS WITH SIV TO VALIDATE HOME INCARCERATION

[75] Inventors: Alexander I. McAllister, Silver Spring, Md.; Robert D. Farris, Sterling, Va.; Michael J. Strauss, Potomac, Md.

[73] Assignee: Bell Atlantic Network Services, Inc., Arlington, Va.

[ * ] Notice: This patent is subject to a terminal disclaimer.

[21] Appl. No.: 08/997,505

[22] Filed: Dec. 23, 1997

Related U.S. Application Data

[63] Continuation-in-part of application No. 08/828,959, Mar. 28, 1997, Pat. No. 5,978,450, and a continuation-in-part of application No. 08/904,936, Aug. 1, 1997.

[51] Int. Cl.⁷ .................................................. H04M 7/00
[52] U.S. Cl. ..................... 379/88.02; 379/201; 379/207
[58] Field of Search ............................... 379/88.01, 88.02, 379/88.03, 201, 207, 210, 211, 212, 216, 229, 230, 142, 38

[56] References Cited

U.S. PATENT DOCUMENTS

| | | | |
|---|---|---|---|
| 4,313,035 | 1/1982 | Jordan et al. | 379/207 |
| 4,551,581 | 11/1985 | Doughty | 379/93.14 |
| 4,582,956 | 4/1986 | Doughty | 379/93.14 |
| 4,759,056 | 7/1988 | Akiyama | 379/197 |
| 4,843,377 | 6/1989 | Fuller et al. | 340/573.4 |
| 4,899,358 | 2/1990 | Blakley | 379/284 |
| 4,899,373 | 2/1990 | Lee et al. | 379/207 |
| 4,961,217 | 10/1990 | Akiyama | 379/88.11 |
| 5,165,095 | 11/1992 | Borcherding | 379/88.03 |
| 5,170,426 | 12/1992 | D'Alessio et al. | 379/38 |
| 5,206,899 | 4/1993 | Gupta et al. | 379/120 |
| 5,243,643 | 9/1993 | Sattar et al. | 379/88.23 |
| 5,247,571 | 9/1993 | Kay et al. | 379/207 |
| 5,329,578 | 7/1994 | Brennan et al. | 379/88.19 |
| 5,333,173 | 7/1994 | Seazholt et al. | 379/45 |
| 5,430,791 | 7/1995 | Feit et al. | 379/88.01 |
| 5,465,290 | 11/1995 | Hampton et al. | 379/88.02 |
| 5,515,426 | 5/1996 | Yacenda et al. | 379/201 |
| 5,566,229 | 10/1996 | Hou et al. | 379/88.02 |
| 5,572,583 | 11/1996 | Wheeler, Jr. et al. | 379/207 |
| 5,586,177 | 12/1996 | Farris et al. | 379/230 |
| 5,659,605 | 8/1997 | Voit et al. | 379/243 |
| 5,661,791 | 8/1997 | Parker | 379/211 |
| 5,666,400 | 9/1997 | McAllister et al. | 379/88.01 |
| 5,719,921 | 2/1998 | Vysotsky et al. | 379/88.01 |
| 5,729,592 | 3/1998 | Frech et al. | 379/127 |
| 5,761,290 | 6/1998 | Farris et al. | 379/207 |
| 5,825,865 | 10/1998 | Oberlander et al. | 379/211 |
| 5,978,450 | 11/1999 | McAllister et al. | 379/88.02 |

*Primary Examiner*—Krista Zele
*Assistant Examiner*—Roland G. Foster
*Attorney, Agent, or Firm*—McDermott, Will & Emery

[57] ABSTRACT

A telephone network provides personalized services based on voice identification of a person making or receiving a call. For example, when a person initiates a call, the network executes a speaker identification/verification procedure to identify the person as a subscriber. The identification/verification process provides a virtual office equipment number corresponding to the identified subscriber. The central office switch servicing the outgoing call receives this virtual number and uses it to retrieve a service profile associated with the subscriber. The switch provides a personalized telephone service to the subscriber during processing of the call, using the retrieved service profile. The personalized service may include a number of unique features, such as recording call related data together with data about the identification of the person. For home incarceration or the like, the service may entail monitoring speech communications to detect certain designated words and automatically terminate the call.

48 Claims, 7 Drawing Sheets

MONITORING FOR KEY WORDS WITH SIV TO VALIDATE HOME INCARCERATION

CROSS-REFERENCE TO RELATED APPLICATION

This application is a continuation-in-part of U.S. patent application Ser. No. 08/828,959 filed Mar. 28, 1997 (now U.S. Pat. No. 5,978,450), and of U.S. patent application Ser. No. 08/904,936 filed Aug. 1, 1997, the disclosures of which are incorporated herein entirely by reference.

TECHNICAL FIELD

The present invention relates to personalized telecommunications service, preferably offered through an intelligent telephone network. In particular, the present invention relates to speaker identification verification and monitoring for key words to validate and control communication in home incarceration.

ACRONYMS

The written description uses a large number of acronyms to refer to various services, messages and system components. Although generally known, use of several of these acronyms is not strictly standardized in the art. For purposes of this discussion, acronyms therefore will be defined as follows:
Address Complete Message (ACM)
Advanced Intelligent Network (AIN)
ANswer Message (ANM)
Automatic Number Identification (ANI)
Call Processing Record (CPR)
Central Office (CO)
Common Channel Interoffice Signalling (CCIS)
Data and Reporting System (DRS)
Destination Point Code (DPC)
Generic Data Interface (GDI)
Initial Address Message (IAM)
Integrated Service Control Point (ISCP)
Integrated Services Digital Network (ISDN)
ISDN User Part (ISDN-UP)
Intelligent Peripheral (IP)
Line Identification Data Base (LIDB)
Multi-Services Application Platform (MSAP)
Office Equipment (OE)
Origination Point Code (OPC)
Personal Communications Service (PCS)
Plain Old Telephone Service (POTS)
Point in Call (PIC)
Personal Identification Number (PIN)
Primary Rate Interface (PRI)
Public Switched Telephone Network (PSTN)
Service Control Point (SCP)
Service Creation Environment (SCE)
Service Management System (SMS)
Service Switching Point (SSP)
Signaling System 7 (SS7)
Signaling Point (SP)
Signaling Transfer Point (STP)
Simplified Message Desk Interface (SMDI)
Speaker Identification/Verification (SIV)
Terminating Attempt Trigger (TAT)
Time Slot Interchange (TSI)
Traffic Service Position System (TSPS)
Transaction Capabilities Applications Part (TCAP)
Transmission Control Protocol/Internet Protocol (TCP/IP)

BACKGROUND ART

The concept of home incarceration has evolved as an alternative to detention in government jail and prison facilities. In cases of relatively light infractions, offenders, rather than being placed as inmates in overcrowded facilities, are confined to predetermined limited geographical areas including, for example, homes, so called half-way houses, workplaces, and the like. The burden on the prison system is relieved by creating additional space for criminals convicted of more serious crimes. Cost efficiency is also a significant factor as the expense of incarceration in a high security facility is quite high. Additionally, the degree of severity of punishment and the prospects of rehabilitation of the light offender are more appropriate to a home incarceration environment than in a prison provided for felons.

In a "house arrest" situation, the detainees, are more likely to have a certain degree of interaction with the community. Public security is a socially sensitive and obviously critical issue and it is important that the activities of such captives be monitored and supervised. The whereabouts and identity of individuals should be capable of being established at any time without the necessity of assignment of a law enforcement officer for constant surveillance on a one to one basis.

U.S. Pat. No. 5,170,426, issued Dec. 8, 1992 to the assignee of the instant application discloses one method and system for home incarceration. According to that system monitoring and verification is performed through a telephone network including a telephone on the premises of the location of confinement and a control center. Voice verification, using voice analysis of speech transmitted in a telephone call from the site to the center is performed during periodic testing. A voice template vocabulary is established for the individual and used for voice verification. Caller line identification of each incoming call is performed to verify that call originates from the appropriate location. The confined individual is required, either randomly or at scheduled intervals, to call the control center and recite a statement including randomly selected words from the template vocabulary.

U.S. Pat. No. 4,843,377 shows an arrangement for home incarceration which contemplates the use of a voiceprint as a means for remote prisoner identification. Audio spectral analysis is performed and applied to speech transmitted over a telephone line to determine a match with a probationer's voiceprint. Several commercially available systems are discussed.

Conventional home incarceration systems generally require one line and associated telephone and office equipment number (OE) for each incarcerated person. This arrangement is relatively costly and requires the use of a large number of individual telephone numbers, which are now in diminishing supply in the current numbering plan.

The public switched telephone network (PSTN) and other telephone networks, such as cellular systems, provide most telephone services based on number identification of the telephone set or line that each party uses. The services which are enabled are individualized only to the extent that a party uses the same line and/or instrument. For example, a customer is typically provided with one set of service features and billing options available via a telephone on an office desk, another set of service features and billing options available via a telephone line to the home, and perhaps a third set of service features and billing options available via a wireless telephone (e.g. cellular or personal communications service (PCS)).

The networks process calls to and from each of these different subscriber telephones based on a separate telephone number. Also, a caller may use personalized billing options by using a calling card, but often the input operations for calling card service are overly complex. With the exception of calling card billing, each person using a particular telephone typically can access only those service features and billing options which are associated with the particular line or telephone instrument.

This phenomenon has already caused subscribers inconvenience in the proliferation of services now being proposed or implemented. For example, circumstances arise in which a subscriber may want a feature or billing option normally associated with one line or instrument, such as the office telephone, when they are in fact using a different line or instrument, such as their home or PCS telephone. Alternatively, two or more persons using one telephone or line often want different sets of service options. The extreme increase in demand for telephone services is rapidly exhausting the capacity of the network, particularly in terms of the telephone numbers available under the current numbering plan.

A number of specific solutions have been proposed for specific problems, such as work at home and/or transfer of service to new location(s) as an individual travels. However, each of these solutions is limited or creates its own new problems.

For example, U.S. Pat. No. 4,313,035 to Jordan et al. discloses a method of using an intelligent network to provide a 'follow-me' type service through multiple exchanges of the switched telephone network using an AIN type of telephone system architecture. Each subscriber to the locator service has a unique person locator telephone number. To access the system to update data in a service control database, the subscriber dials 0700 and his unique person locator telephone number. The telephone switching office routes the call to a traffic service position system (TSPS) which prompts the caller (e.g. provides an additional dial tone) and receives further digits from the subscriber. The subscriber inputs a three digit access code, indicating the type of update call, and a four digit personal identification number. If calling from the remote station to which the subscriber wishes his calls routed, the local switching office forwards the line identification number of that station to the TSPS. The TSPS forwards the dialed information and the line identification to the data base for updating the particular subscriber's location record. A caller wishing to reach the subscriber dials the subscriber's unique person locator number. A telephone switching office sends the dialed number to the central database. The database retrieves the stored completion number for the called subscriber and forwards that number back to the switching office to complete the call.

The Jordan et al. approach allows calls to follow the subscriber to each new location, but the subscriber must have a unique telephone number for this service. Each station that receives a call also must have a unique telephone number. As such, the Jordan et al. approach actually exacerbates the shortage of telephone numbers. Also, Jordan et al. rely on subscriber input of identification numbers. Subscribers often find this inconvenient, and this technique is often prone to number entry errors.

U.S. Pat. No. 4,899,373 to Lee et al. discloses a system for providing special telephone services to a customer on a personal basis, when the customer is away from his or her home base or office. The personalized services are provided in a multiple exchange office environment, using a central database for feature control. The nationally accessible central database system stores feature data in association with personal identification numbers. A subscriber wishing to use his personalized features while away from home base dials a special code and presents the personal identification number. The exchange transmits a query to the central database, and the corresponding feature data is retrieved from the database. The database forwards the feature data to the exchange, and the exchange stores the received feature data in association with the station from which the request was initiated. Subsequently, the exchange accesses the downloaded feature data to provide telephone service corresponding to the subscriber's personalized telephone features via the station the subscriber is currently operating from. A temporary office arrangement may be established in which the personalized features will be immediately available on incoming and outgoing calls for a period of time specified by the subscriber.

U.S. Pat. No. 5,206,899 to Gupta et al. pertains to a system wherein a subscriber can assign desired characteristics to any "target station" which is an active telephone accessible to a telecommunications network. A call thereafter that originates from the target station can use customized features, such as account code dialing and corporate billing arrangements. Initially, a service profile is created and stored for each subscriber and contains information describing desired features and billing options. The characteristics of a particular target station are changed by an activation process that can be initiated from any location. Automatic number identification (ANI) information associated with the target station is entered into an ANI trigger table in an intelligent switch, and the service profile is loaded into a database. When a call originates from the target station, information in the database is applied to the switch to provide the desired characteristics. An example of one of the features is when an employee of company X wishes to make business related calls from his/her telephone, the call has the characteristics of a call made from the office by a special billing arrangement.

Like Jordan, the Lee et al. and Gupta et al. systems depend on a dialed number entry by the subscriber to activate the service. Also, the Lee et al. and Gupta et al. systems do not provide a simple manner for more than one subscriber to obtain personalized service over the same telephone line. In Lee et al., during the period when the switch stores the roaming subscriber's profile in association with the line, all calls are processed based on that one profile. Similarly, in Gupta et al., while the ANI trigger is set against the line, all outgoing calls cause database access and use of the subscriber's profile in the database. There is no way to fall back on the normal profile for that line unless and until the service for the roaming subscriber is cancelled with respect to that one line.

U.S. Pat. No. 5,247,571 to Kay et al. discloses an Area Wide Centrex service provided by an advanced intelligent telephone network. The service provides centrex features, such as extension dialing, to multiple locations. The Kay et al. Patent also suggests a Work-at-Home feature. This feature allows the home telephone line to selectively operate as a residential line or as a Centrex business line, on a call-by-call basis. For a business call, the user would preface each call with an access indicator to identify a business call. When an outgoing call from the home line lacks the access indicator, the network processes the call as a standard residential call.

The Work-at-Home feature in the Kay et al. system requires only dialing of a code before each outgoing business call. However, the Kay et al. approach requires that the business profile is stored in association with the home line before the subscriber makes the call. The subscriber can use the Centrex billing and service features from the business account only from a home telephone previously associated with the business line. The subscriber can not use the billing and service features from the business account from any randomly selected telephone. Also, from the home line, a person can either use the normal residential profile service or the pre-defined business profile service. There is insufficient flexibility to enable a wider range of services for multiple subscribers through the one line.

An increasingly popular telephone service is caller identification or 'caller ID'. The telephone network identifies the telephone number associated with the line or instrument used by the calling party and supplies the number and or the name to a display device at the called customer's premises. This procedure, or the ANI (automatic number identification) equivalent thereof, has been relied upon in prior home incarceration services to identify the line assigned to each detainee.

Subscribers having ISDN service receive caller ID data, for display at the time of an incoming call, in the form of a data message which the end office switch transmits over the D-channel. For analog telephone customers, however, existing caller ID utilizes in-band transmission technology similar to that described in U.S. Pat. Nos. 4,582,956 and 4,551,581 to Doughty. In such a system, the end office switch connected to the called party's line transmits directory number data for the calling party's telephone line as frequency shift keyed (FSK) data inserted in the silent interval between ringing signal pulses applied to the called party's line. The receiving apparatus includes a line interface unit, a converter, a control circuit and a display unit. A frequency shift keyed (FSK) signal representing the special service information is filtered from the ringing signals by the line interface unit. The converter detects the FSK signal and demodulates the special service information from the FSK signal. Following detection of the FSK signal, the control circuit receives and stores the special service information. The stored information is periodically sent to the display unit to begin exhibiting thereof during the silent interval before the next ringing signal.

The local telephone exchange carriers have recently begun offering an enhanced form of caller ID, sometimes referred to as 'Caller ID Deluxe' service. This enhanced service utilizes AIN type call processing to access a Line Information Database (LIDB) to translate the calling party's directory number into name data. The end office switch forwards the name data and the normal caller ID telephone number as FSK encoded data inserted in the silent intervals between ringing signals.

The LIDB database includes a single listing for each telephone line and translates each number into a single name, typically the name of the party identified as the customer or subscriber for billing purposes. In fact, the LIDB database provides this single translation even for calls from one line having multiple telephone numbers. Consider an example in which a family has one line with two numbers and a distinctive ringing service. The first number is used for the family as a whole, and the second number is used for a teenage son or daughter. The distinctive ringing allows people in the household to know whether or not each call is for the teenager. On outgoing calls, however, the end office switch always identifies the line by the primary number (the family's number), and the LIDB database always provides the name of the billing subscriber, e.g. the father's name. As a result, when the teenager calls a friend, the friend will receive the main number and possibly the father's name. If the friend calls back using the information from his caller ID display terminal, the friend calls the family's main number, not the teenager's number.

However, the above discussed examples of prior suggestions to customize services have not adapted the caller identification to correspond to the actual party using the telephone on the outgoing call. For example, in a system like that of Lee, Gupta or Kay, the caller might use features and billing options associated with her personalized or work service, but any such calls would produce a caller ID display identifying the number of the station from which she originated the call. If the called party subscribed to the name type enhanced caller ID, the network would provide a name associated with that telephone number, not the name of the actual calling party.

U.S. Pat. Nos. 4,961,217 and 4,759,056 disclose a card based system for providing personalized features, including caller name display. Each user has a "portable memory device" in the form of an identification card bearing personal information including identification information. When initiating a call, the user inserts the card in the calling station, and information from the card is transmitted to the central switching system. In one embodiment, the switching system translates the identification information from the card to produce a textual representation of the calling party's name and transmits that information to a called terminal for display. Although this system does provide a name display identifying the actual called party, the system requires the use of the identification card and specialized calling terminals for reading the information from the cards.

As shown by the above discussion, a need still exists for an effective and convenient system for providing individualized calling service features, including actual caller as well as line identification.

DISCLOSURE OF THE INVENTION

The present invention addresses the above noted problems and provides advances over the existing technology by individualizing telecommunication services based on a speech authenticated identification of the actual calling person as well as the actual answering person. Offices of a communication network utilize profile data associated with an identified person, rather than profile data associated with a particular telephone number or a particular communication link. In some of the preferred service embodiments, the network uses a virtual office equipment number assigned to the person's profile data to retrieve the data for providing a requested service, such as home incarceration, reducing or eliminating the need for assignment of additional telephone numbers. The network also provides caller identification information to a called destination, including data, such as an identity by name and voice, specifically associated with the person speaking into the telephone instrument.

Thus, in one aspect the present invention relates to a method of providing service through a communication network. An attempt to make a call from a predetermined link through the network is detected. The next step in the method is receiving and processing speech signals from a person via the predetermined link. The processing identifies the person making the call as one of a number of individuals expected to seek services offered through the communication network. An instruction is sent to a switching office of the network instructing that office to utilize profile data corresponding to the identified individual for processing of the call. As part of subsequent call processing, the network transmits data representing the identity of the subscriber to a predetermined destination. In the home incarceration embodiments, the data may be the identity of the person speaking into the telephone instrument by name or a short code identifying by voice recognition the person as one of the individuals associated with the station or line from which the person initiated or answered the call.

Another aspect of the invention relates to a call processing methodology using profile information selected by means of a virtual office equipment number. This method includes identifying one party utilizing a specific communication service, for example the person making an outgoing call, as one of a plurality of persons. Using a virtual office equipment number, assigned to the identified one person, corresponding profile data is retrieved from storage. A communication network provides the requested communication service over a communication link, based at least in part on the retrieved profile data. As part of the service, a portion of the retrieved profile data is used to provide an identification of the one person over another link of the communication network.

In the preferred embodiments, the identification information or information derived therefrom is transmitted to a predetermined destination or destinations to identify either the person placing or the person answering the call to another participant to the communication service, e.g. to identify a specific incarcerated person as the person on the call. When transmitted to the destination, the data may be a code corresponding to the incarcerated person, but where the destination includes appropriate equipment, the data sent to the destination includes the name and other criteria specific to the incarcerated person. Several techniques are envisioned for providing the identifying data to the destination. In one embodiment, the incarcerated person profile data supplies all identifying criteria sought. In another embodiment, the profile data provides an identifier, and a remote database is accessed to translate the identifier into additional data.

Other aspects of the invention relate to the communication network implementing the individualized functions, including caller person specific identification. The preferred implementation of the communication network is an intelligent implementation of a public switched telephone network. The preferred network includes a number of central office switches interconnected by trunk circuits and servicing a substantial number of telephone links. The intelligent network also includes a service control point storing a database of records used in controlling services provided through the central offices. A first signaling network carries signaling messages between the offices as well as signaling messages between the offices and the service control point. The peripheral also may exchange signaling information with the service control point, preferably over a second signaling network.

Another aspect of the invention relates to an improved central office switching system capable of processing a call using profile information selected in response to a virtual equipment number. An office equipment number is 'virtual' where it is assigned to an individual person, instead of to specific network equipment such as a line termination or a specific station.

The switching system includes interface modules coupled to the communication links and a switch providing selective communication connections between the interface modules. An administrative module controls connections provided by the switch. The administrative module includes mass storage containing subscriber profiles, a processor for providing control instructions to the switch, and a signaling interface for signaling communication with at least one external network node. In response to a virtual office equipment number received via the signaling interface, e.g. from a separate peripheral platform as discussed above, the processor retrieves a subscriber profile corresponding to the virtual office equipment number from the mass storage. The processor uses the retrieved profile to process a selective connection through the switch between two of the interface modules. In accord with this aspect of the invention, the retrieved profile data actually provides data identifying the person, typically for use in identifying the person to an incarceration supervising authority or agent.

Advantages of the personal identification service should be readily apparent to those skilled in the telecommunications art. For example, in the shared line application, several incarcerated individuals can share a single line or communication link as well as a single telephone number. Outgoing call features, however, are personalized to each detainee. For example, the network can provide each subscriber a specifically individualized service, and each individual can receive a separate bill. The associated caller identification service provides an identification of each actual caller, not just one party named as the primary subscriber on one billing account for the originating station or line. The service uses speech based identification, eliminating the burden of dialing long strings of identifying digits. The system provides the ability to signal for a specific individual to answer, the ability to confirm that that individual did answer, the ability to confirm that the call was made, and the ability to associate the call with a charge or bill.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitation. In the figures, like reference numerals refer to the same or similar elements.

BEST MODE FOR CARRYING OUT THE INVENTION

In response to each of several types of service requests, the personal dial tone service of the present invention initially identifies a calling or responding individual, who may be an incarcerated person or, in the more general application described in the above identified parent applications, the subscriber. This identification is established preferably by using a speaker identification/verification procedure. The system then retrieves profile information corresponding to the identified individual. The communication network processes one or more calls to or from an identified communication link using the individual's profile data.

On an outgoing telephone call from the individual, for example, the service request may be an off-hook signal, and the network may provide 'dial-tone' type telephone services based on the retrieved profile information. In this example, the network may provide a dial tone signal or a customized prompt and then permit the caller to out-dial a call. Caller identification, calling features and/or billing functions apply based on the profile information, e.g. to provide the name of the actual calling party, to bill the call to this one individual's personal account, and to prevent calls which are proscribed for an individual detainee. As will be described in further detail hereinafter, other specialized procedures may be called for in the profile of an incarcerated person, such as, for example, a monitoring for pre-specified key words. The network may also provide personalized services on incoming calls to the detainee.

The personal dial tone service in its broadest form may utilize a variety of different networks. For example, the service may be adaptable to Internet based voice communications. However, in the present home incarceration application such difficult to control applications as Internet applications would typically be prohibited. The preferred embodiments, including home incarceration, utilize various implementations of modern telephone networks. To understand the invention, it may be helpful first to consider the architecture and operation of an advanced intelligent network (AIN) type implementation of a public switched telephone network.

Figure 1:
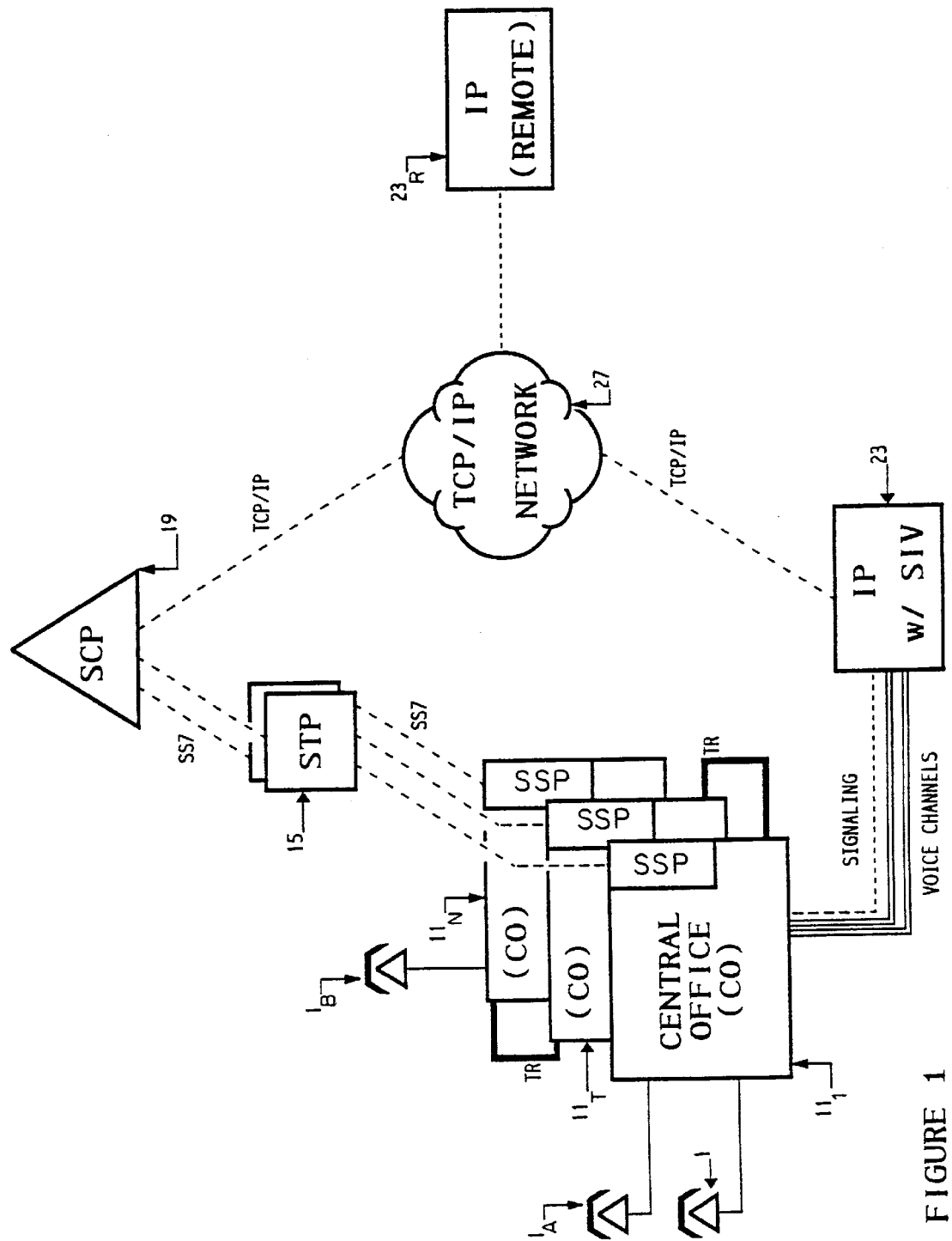
FIG. 1 is a simplified block diagram of an intelligent telephone network that may be used to offer a personal dial tone service which may be utilized to provide one preferred embodiment of the present invention.

FIG. 1 provides a simplified illustration of the preferred intelligent telephone network for implementing the personal dial tone service in accord with the present invention. As shown, the telephone network includes a switched traffic network and a common channel signaling network carrying the control signaling messages for the switched telephone traffic network. In this implementation, the system further includes a secondary signaling network.

The telephone or traffic network (operated by a combination of local carriers and interexchange carriers) includes a number of end office and tandem office type central office switching systems 11. FIG. 1 shows a number of subscriber stations, depicted as telephones 1, connected to a series of central office switches $11_1$ to $11_N$. In the preferred implementation, the connections to the central office switches 11 utilize telephone lines, and the switches are telephone type switches for providing landline communication. However, it should be recognized that other communication links and other types of switches could be used. Trunk circuits TR carry communication traffic between the central office switches 11.

Each end office type central office switch, such as 11 and $11_N$, provides switched telephone connections to and from local communication lines or other subscriber links coupled to end users stations or telephone sets 1. For example, the central office $11_1$ serves as an end office to provide switched telephone connections to and from local communication lines coupled to end users telephone station sets, such as telephone $1_A$, whereas the central office $11_N$ serves as an end office to provide switched telephone connections to and from local communication lines coupled to end users telephone station sets, such as telephone $1_B$.

The typical telephone network also includes one or more tandem switching offices such as office $11_T$, providing trunk connections between end offices. As such, the traffic network consists of local communication links and a series of switching offices interconnected by voice grade trunks, only two examples of which are shown at TR in FIG. 1. One set of trunks TR might interconnect the first end office $11_1$ to the tandem office $11_T$, whereas another set of trunks TR might interconnect the tandem office $11_T$ to another end office $11_N$. Other trunks might directly connect end offices. Although not shown, many offices serve as both end offices and tandem offices for providing different call connections.

FIG. 1 shows connections to the stations 1 via lines, and typically these links are telephone lines (e.g. POTS or ISDN). It will be apparent to those skilled in the art, however, that these links may be other types of communication links, such as wireless links. The telephone stations may have caller ID capability. If the line is an ISDN line, the station may incorporate a display for visually presenting the caller ID information and other signaling related messages. If the link is a typical analog telephone line, the customer premises equipment includes a caller ID terminal, one example of which is shown at $5_B$. The terminal $5_B$ displays at least telephone numbers and preferably displays alphanumeric information to enable displays of callers names.

Although shown as telephones in FIG. 1, the terminal devices or stations 1 can comprise any communication device compatible with the local communication link. However in the case of home incarceration the terminal would be a telephone terminal. The processing in accord with the instant embodiment of the invention relies on identification of the subscriber, preferably by voice based recognition. For this purpose, the terminals preferably include two-way voice communication elements.

The lines and trunks through the central offices 11 carry the communication traffic of the telephone network. The preferred telephone network, however, also includes a common channel interoffice signaling (CCIS) network carrying a variety of signaling messages, principally relating to control of processing of calls through the traffic portion of the network. The CCIS network includes packet data links (shown as dotted lines) connected to appropriately equipped central office switching systems such as offices 11 and a plurality of packet switches, termed Signaling Transfer Points (STPs) 15. To provide redundancy and thus a high degree of reliability, the STPs 15 typically are implemented as mated pairs of STPs. The CCIS network of the telephone system operates in accord with an accepted signaling protocol standard, preferably Signaling System 7 (SS7).

In the typical embodiment shown in FIG. 1, each central office 11 has at least minimal SS7 signaling capability, which is conventionally referred to as a signaling point (SP)

in reference to the SS7 network. As such, the offices can exchanges messages relating to call set-up and tear-down, typically in ISDN-UP format. At least some, and preferably all, of the central office switches 11 are programmed to recognize identified events or points in call (PICs) as advanced intelligent network (AIN) type service triggers. In response to a PIC or trigger, a central office 11 initiates a query through the CCIS signaling network to a control node to either a Service Control Point (SCP) 19 or to a database system, such as a Line Identification Database (LIDB) 21. The SCP 19 provides instructions relating to AIN type services. The LIDB 21 provides subscriber account related information, for calling card billing services or for subscriber name display purposes in an enhanced caller ID application. Those central office switching systems having full AIN trigger and query capability for communication with the SCP and/or the LIDB are referred to as Service Switching Points (SSPs).

The central office switches 11 typically consist of programmable digital switches with CCIS communications capabilities. One example of such a switch is a 5ESS type switch manufactured by AT&T; but other vendors, such as Northern Telecom and Seimens, manufacture comparable digital switches which could serve as the SSPs and SPs. The SSP type implementation of such switches differs from the SP type implementation of such switches in that the SSP switch includes additional software to recognize the full set of AIN triggers and launch appropriate queries. A specific example of an SSP capable switch is discussed in detail later, with regard to FIG. 2.

One key feature of the present invention is that the program controlled switch accepts instructions to load profiles and/or receives profiles over a signaling link. In most cases, these profiles are identified by virtual office equipment numbers. The profiles include a range of information relating to subscribers services, such as service features, classes of service and individual billing options. In accord with the preferred embodiment of the instant invention, the profiles related to persons subject to home incarceration and include features not normally found in typical telephone subscriber profiles. Thus these profiles may also include at least data relating to the identity of the individual, to facilitate caller identification which will provide the identity of the actual caller to the incarceration supervisor, agent, or controller. The profile also preferably includes call control parameters. These parameters result in limitation of outgoing calls to identified classes of called parties, and in certain instances to a limited number of specific individuals. The profile may also include a list of identified key words and telephone circuit signals for which the telephone calls will be monitored. Such words may include credit card names such as, for example, Visa, Master Card, American Express, and the like. The telephone signals may include certain combinations of DTMF signals, dial-tone, hook-flash, and other signals that indicate that proscribed action is imminent.

The above described data signalling network between the SSP type central offices 11 and the SCP 19 is preferred, but other signalling networks could be used. For example, instead of the packet switched type links through one or more STP's, a number of central office switches, an SCP and any other signaling nodes could be linked for data communication by a token ring network. Also, the SSP capability may not always be available at the local office level, and several other implementations might be used to provide the requisite SSP capability. For example, none of the end office switches may have SSP functionality. Instead, each end office would connect through a trunk to a tandem office which has the SSP capability. The SSP tandem then communicates with the SCP via an SS7 type CCIS link, as in the implementation described above. The SSP capable tandem switches are digital switches, such as the 5ESS switch from AT&T; and the non-SSP type end offices might be 1A analog type switches.

The SCP 19 may be a general purpose computer storing a database of call processing information. In the preferred implementation, the SCP 19 actually is an Integrated Service Control Point (ISCP) developed by Bell Atlantic and Bell Communications Research. The ISCP is an integrated system. Among other system components, the ISCP includes a Service Management System (SMS), a Data and Reporting System (DRS) and the actual database also referred to as a Service Control Point (SCP). In this implementation, the SCP maintains a Multi-Services Application Platform (MSAP) database which contains call processing records (CPRs) for processing of calls to and from various subscribers. The ISCP also typically includes a terminal subsystem referred to as a Service Creation Environment or SCE for programming the MSAP database in the SCP for the services subscribed to by each individual customer.

The components of the ISCP are connected by an internal, high-speed data network, such as a token ring network. The internal data network also typically connects to a number of interfaces for communication with external data systems, e.g. for provisioning and maintenance. In the preferred embodiment, one of these interfaces provides communications to and from the SCP 19 via a packet switched data network, such as the TCP/IP network 27.

The SCP may be implemented in a variety of other ways. The SCP may be a general purpose computer running a database application and may be associated with one of the switches. Another alternative is to implement a database of CPRs or the like within an STP (see e.g. Farris et al. U.S. Pat. No. 5,586,177).

The LIDB database 21 is a general purpose computer system having a signaling link interface or connection to a pair of STPs 15. The computer runs a database program to maintain a database of information relating to customer accounts and identifications. For example, a subscriber's entry in the LIDB database might include the subscriber's telephone number, a personal identification number for credit card billing purposes (in non-incarceration uses), and the subscriber's name and address.

The preferred telephone network also includes one or more intelligent peripherals (IPs) 23 to provide enhanced announcement and digit collection capabilities and speech recognition. The IP 23 is essentially similar to that disclosed in commonly assigned U.S. Pat. No. 5,572,583 to Wheeler, Jr. et al. entitled "Advanced Intelligent Network with Intelligent Peripherals Interfaced to the Integrated Services Control Point," and the disclosure of the network and operation of the IP disclosed from that Patent is incorporated herein in its entirety by reference.

The IP 23 may connect to one or more central offices 11. The connections transport both communication traffic and signaling. The connection between a central office 11 and the IP 23 may use a combination of a Ti and a Simplified Message Desk Interface (SMDI) link, but preferably this connection utilizes a primary rate interface (PRI) type ISDN link. Each such connection provides digital transport for a number of two-way voice grade type telephone communications and a channel transporting signaling data messages in both directions between the switch and the IP.

As discussed more later, there are certain circumstances in which the SCP 19 communicates with the IP 23. These communications could utilize an 1129 protocol and go through an SSP type central office 11 and the SS7 network. However, in the preferred embodiment of FIG. 1, the IP 23 and the SCP 19 communicate with each other via a separate second signaling network 27. These communications through network 27 between the IP and the SCP may utilize an 1129+ protocol or a generic data interface (GDI) protocol as discussed in the above incorporated Patent to Wheeler, Jr. et al.

The IP 23 can provide a wide range of call processing functions, such as message playback and digit collection. In the preferred system of the instant invention, the IP also performs speaker identification/verification (SIV) on audio signals received from the detainees (or subscriber's in other applications of the generic invention). Specifically, the IP 23 used for the personal dial tone service includes a voice authentication module to perform the necessary speaker identification/verification function. The IP 23 also includes storage for detainee or subscriber specific template or voice feature information, for use in identifying and authenticating detainees or subscribers based on speech.

In the simplest form, the IP 23 serving a subscriber's local area stores the templates and performs the speaker identification/verification. However, in a system serving a large geographic area and providing personal dial tone to a large, roaming subscriber base, the templates may be transferred between SCP/IP pairs, to allow an IP near a subscriber's current location to perform the speaker identification/verification on a particular call. For example, if a remote IP $23_R$ required a template for a subscriber from the region served by the IP 23, the remote IP $23_R$ would transmit a template request message through the network 27 to the IP 23. The IP 23 would transmit the requested template back through the network 27 to the remote IP $23_R$.

In a network such as shown in FIG. 1, routing typically is based on dialed digit information, profile information regarding the link or station used by the calling party and profile information regarding a line or station in some way associated with the dialed digits. Each exchange is identified by one or more three digit codes. Each such code corresponds to the NXX digits of an NXX-XXXX (seven digit) telephone number or the three digits following the area code digits (NPA) in a ten-digit telephone number. The telephone company also assigns a telephone number to each subscriber line connected to each switch. The assigned telephone number includes the area code and exchange code for the serving central office and four unique digits.

Central office switches utilize office equipment (OE) numbers to identify specific equipment such as physical links or circuit connections. For example, a subscriber's line might terminate on a pair of terminals on the main distribution frame of a switch 11. The switch identifies the terminals, and therefore the particular line, by an OE number assigned to that terminal pair. For a variety of reasons, the operating company may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, an end office type switch will detect an off-hook condition on the line and provide dial tone. The switch identifies the line by its OE number. The office also retrieves profile information corresponding to the OE number and off-hook line. If needed, the profile identifies the currently assigned telephone number. The switch in the end office receives dialed digits and routes the call. The switch may route the call to another line serviced by that switch, or the switch may route the call over trunks and possibly through one or more tandem offices to an office that serves the called party's station or line. The switch terminating a call to a destination will also utilize profile information relating to the destination, for example to forward the call if appropriate, to apply distinctive ringing, etc.

AIN call processing involves a query and response procedure between an SSP capable switching office 11 and a database system, such as the SCP 19. The SSP capable switching offices initiate such processing upon detection of triggering events. At some point during processing of a telephone call, a central office switching system 11 will recognize an event in call processing as a 'Point in Call' (PIC) which triggers a query to the SCP 19. Ultimately, the SCP 19 will return an instruction to the switching system 11 to continue call processing. This type of AIN call processing can utilize a variety of different types of triggers to cause the SSPs 11 to initiate the query and response signaling procedures with the SCP 19. In the example discussed below, the personal dial tone service utilizes an off-hook immediate trigger, a dialed number trigger and a terminating attempt trigger (TAT), to facilitate different aspects of that service.

In accord with one aspect of the present invention, before providing dial-tone service, the SSP central office 11 that is serving an outgoing call extends the call to the IP 23 providing the speaker identification/verification (SIV) functionality. In the preferred embodiments, this operation involves AIN type call routing to the IP. The IP 23 prompts the caller and collects identifying information, preferably in the form of speech. The IP analyzes the caller's input to identify the caller as a particular subscriber or detainee. If successful, the IP signals the SSP to load profile data for that subscriber or detainee into the register assigned to the call in the call store. In most of the preferred service applications, the IP disconnects, and the SSP central office 11 processes the call in accord with the loaded profile information. For example, the central office 11 may now provide actual dial tone or provide a message prompting the caller to dial a destination number. The caller dials digits, and the central office processes the digits to provide the desired outgoing call service, in the normal manner. The IP may stay on the line, to monitor speech and thus caller identity, and to monitor for prestored key words or telephone signals for the home incarceration application which constitutes the preferred embodiment of the present invention.

The call processing by the central office switch 11 utilizes the loaded subscriber or detainee profile information. For example, the profile data may indicate specific procedures for billing the call to this subscriber on some account not specifically linked to the originating telephone station or line. For example, in a college dormitory, the billing information might specify billing of a student's calls to the account of the student's parent(s). Any call restrictions, imposed at the wish of the parents, would be reflected in the profile. The switch would restrict the calling services accordingly, e.g. to limit distance, cumulative cost and/or duration of calls. In the preferred home incarceration embodiment the profile reflects restrictions and conditions associated with the individual detainees.

The inventors also envision use of selected subscriber profile information on incoming calls. When a serving central office SSP 11 detects a call to a line having the service of the invention, processing hits a terminating attempt trigger (TAT). The SSP interacts with the SCP 19 and routes the call to the IP 23. The IP 23 prompts the caller to identify a desired called party, e.g. one of the detainees sharing the telephone instrument or terminal. Menu announcement together with either digit collection or preferably speech recognition processing by the IP 23 facilitates identification of the desired called party from those associated with the line. Based on identification of the called party, the IP 23 signals the SSP switch 11 to load profile data for that party into the register assigned to the call in the call store. In this case, however, the switch 11 uses selectively loaded profile information for terminating the call. The IP disconnects, and the SSP central office 11 processes the call in accord with the loaded profile information.

For example, the central office 11 may provide a distinctive ringing signal corresponding to the identified called party. This service enables distinctive ringing for multiple parties on one line without assigning each party a separate telephone number. In non-incarceration embodiments the loaded profile information may specify call forwarding in event of a busy or no-answer condition. This enables routing of the call to the identified subscriber's mailbox, or another alternate destination selected by the subscriber, even though the call did not utilize a unique telephone number uniquely assigned to the called subscriber.

The present invention also encompasses a procedure in which a subscriber calls in from a line not specifically designated for personal dial tone service. In the incarceration embodiment this may occur in the case of detainees who are allowed pre-determined release time. The network routes the call to the IP 23, and the IP identifies the caller and the line from which the call was made. The caller can interact with the IP 23 to have her personal dial tone service associated with that line, either for one call or for some selected period of time. The IP 23 instructs the appropriate central office switch(es) 11 to load profile data associated with the caller.

The IP 23 might instruct the end office switch to load the profile data only in the assigned call store register. The switch would use the profile data only for a single call, for example to bill a call from a pay-phone or a hotel room telephone to the subscriber's home account in the situation where the detainee is allowed this privilege. Alternatively, the IP 23 might instruct the central office 11 serving the line to the calling station 1 to utilize a virtual office equipment number (OE) and associated profile data for calls to and from that line for some period of time. In this later example, the IP 23 would also instruct the central office 11 serving the line to the subscriber's home station 1 to modify the subscriber's profile to forward calls for the subscriber's telephone number. The modified profile data in the home office 11 would result in forwarding of the subscriber's incoming calls through the office 11 to the selected station 1, for the set period of time.

The present invention relies on the programmable functionality of the central office switches and the enhanced call processing functionalities offered by the IPs. To understand these various functionalities, it may be helpful to review the structure and operation of a program controlled central office and one implementation of an IP. Subsequent description will explain several of the above outlined call processing examples in greater detail.

Figure 2:
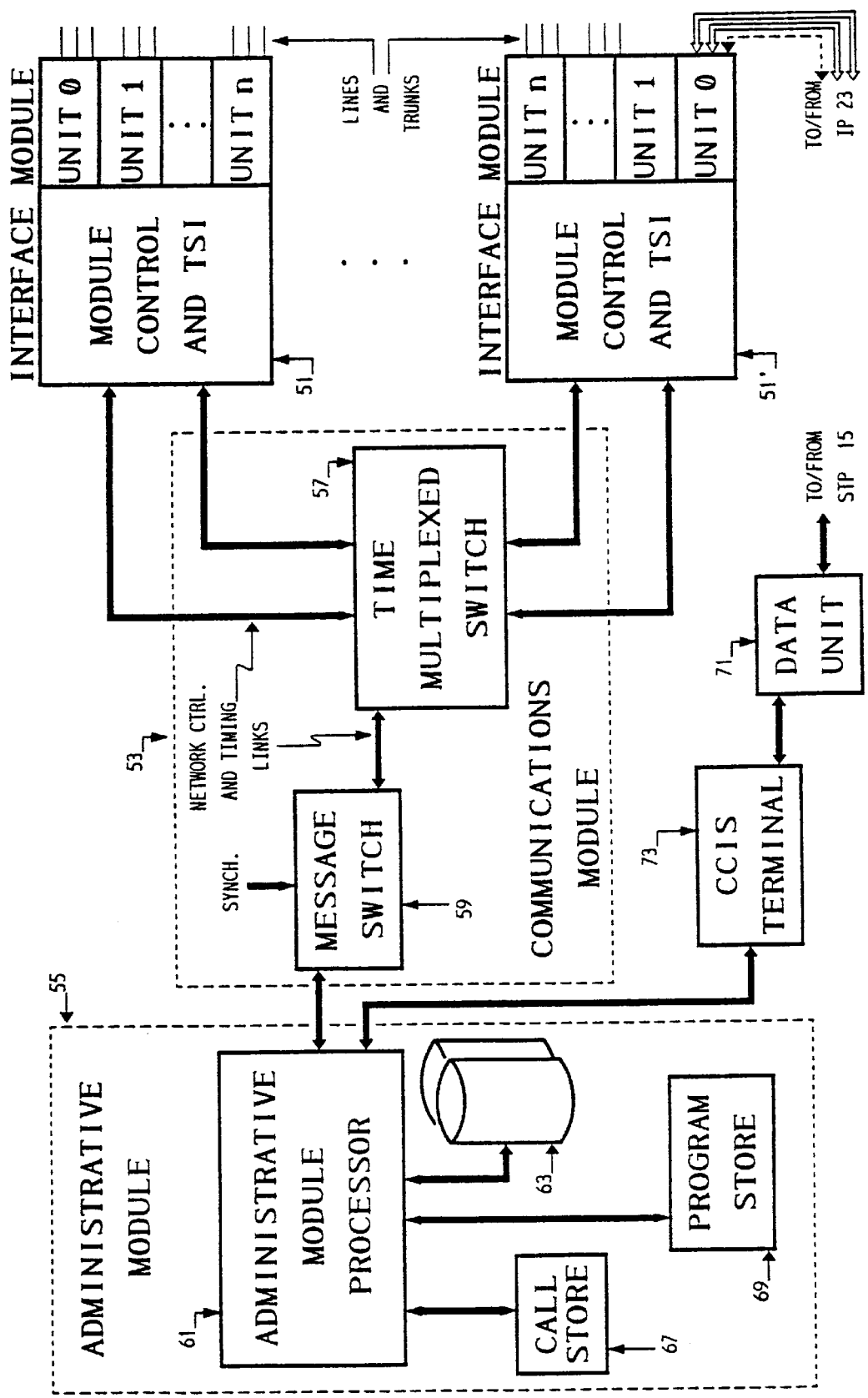
FIG. 2 is a simplified block diagram illustrating the significant functional components of an SSP type central office switching system used in the network of FIG. 1.

FIG. 2 is a simplified block diagram of an electronic program controlled switch which may be used as any one of the SSP type central offices 11 in the system of FIG. 1. As illustrated, the switch includes a number of different types of modules. In particular, the illustrated switch includes interface modules 51 (only two of which are shown), a communications module 53 and an administrative module 55.

The interface modules 51 each include a number of interface units 0 to n. The interface units terminate lines from subscribers' stations, trunks, T1 carrier facilities, etc. Each such termination is identified by an OE number. Where the interfaced circuit is analog, for example a subscriber loop, the interface unit will provide analog to digital conversion and digital to analog conversion. Alternatively, the lines or trunks may use digital protocols such as T1 or ISDN. Each interface module 51 also includes a digital service unit (not shown) which is used to generate call progress tones and receive and detect dialed digits in pulse code or dual-tone multifrequency form.

In the illustrated embodiment, the unit 0 of the interface module 51' provides an interface for the signaling and communication links to the IP 23. In this implementation, the links preferably consist of one or more ISDN PRI circuits each of which carries 23 bearer (B) channels for communication traffic and one data (D) channel for signaling data.

Each interface module 51 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the time multiplexed switch 57 and a message switch 59. The time multiplexed switch 57 provides time division transfer of digital voice data packets between voice channels of the interface modules 51 and transfers signaling data messages between the interface modules. The switch 57 together with the TSIs of the interface modules form the overall switch fabric for selectively connecting the interface units in call connections.

The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example a link for receiving a synchronization carrier used to maintain digital synchronism.

The administrative module 55 provides high level control of all call processing operations of the switch 11. The administrative module 55 includes an administrative module processor 61, which is a computer equipped with disc storage 63, for overall control of CO operations. The administrative module processor 61 communicates with the interface modules 51 through the communication module 55. The administrative module 55 may include one or more input/output processors (not shown) providing interfaces to terminal devices for technicians and data links to operations systems for traffic, billing, maintenance data, etc.

A CCIS terminal 73 and an associated data unit 71 provide an SS7 signalling link between the administrative module processor 61 and one of the STPs 15 (see FIG. 1). Although only one such link is shown, preferably there are a plurality of such links providing redundant connections to both STPs of a mated pair and providing sufficient capacity to carry all necessary signaling to and from the particular office 11. The SS7 signaling through the terminal 73, the data unit 71 and the STPs provides two-way signaling data transport for call set-up related messages to and from other offices. These call set-up related messages typically utilize the ISDN-UP (ISDN-users part) protocol portion of SS7. The SS7 signaling through the terminal 73, the data unit 71 and the STPs also provides two-way signaling data transport for communications between the office 11 and database systems or the like, such as the SCP 19. The communications between the office 11 and the database systems or the like utilize the TCAP (transactions capabilities applications part) protocol portion of SS7.

As illustrated in FIG. 2, the administrative module 55 also includes a call store 67 and a program store 69. Although shown as separate elements for convenience, these are typically implemented as memory elements within the computer serving as the administrative module processor 61. The program store 69 stores program instructions which direct operations of the computer serving as the administrative module processor 61.

For each call in progress, a register assigned within the call store 67 stores translation and user profile information retrieved from disc storage 63 together with routing information and any temporary information needed for processing the call. For example, for a residential customer initiating a call, the call store 67 would receive and store line identification and outgoing call billing information corresponding to an off-hook line initiating a call. For the personal dial-tone service, the assigned register in the call store 67 will receive and store different profile data depending on the particular subscriber or detainee associated with any given call. A register in the call store is assigned and receives profile data from the disc memory both for originating subscribers or detainees on outgoing calls and for terminating subscribers or detainees on incoming calls.

Figure 3:
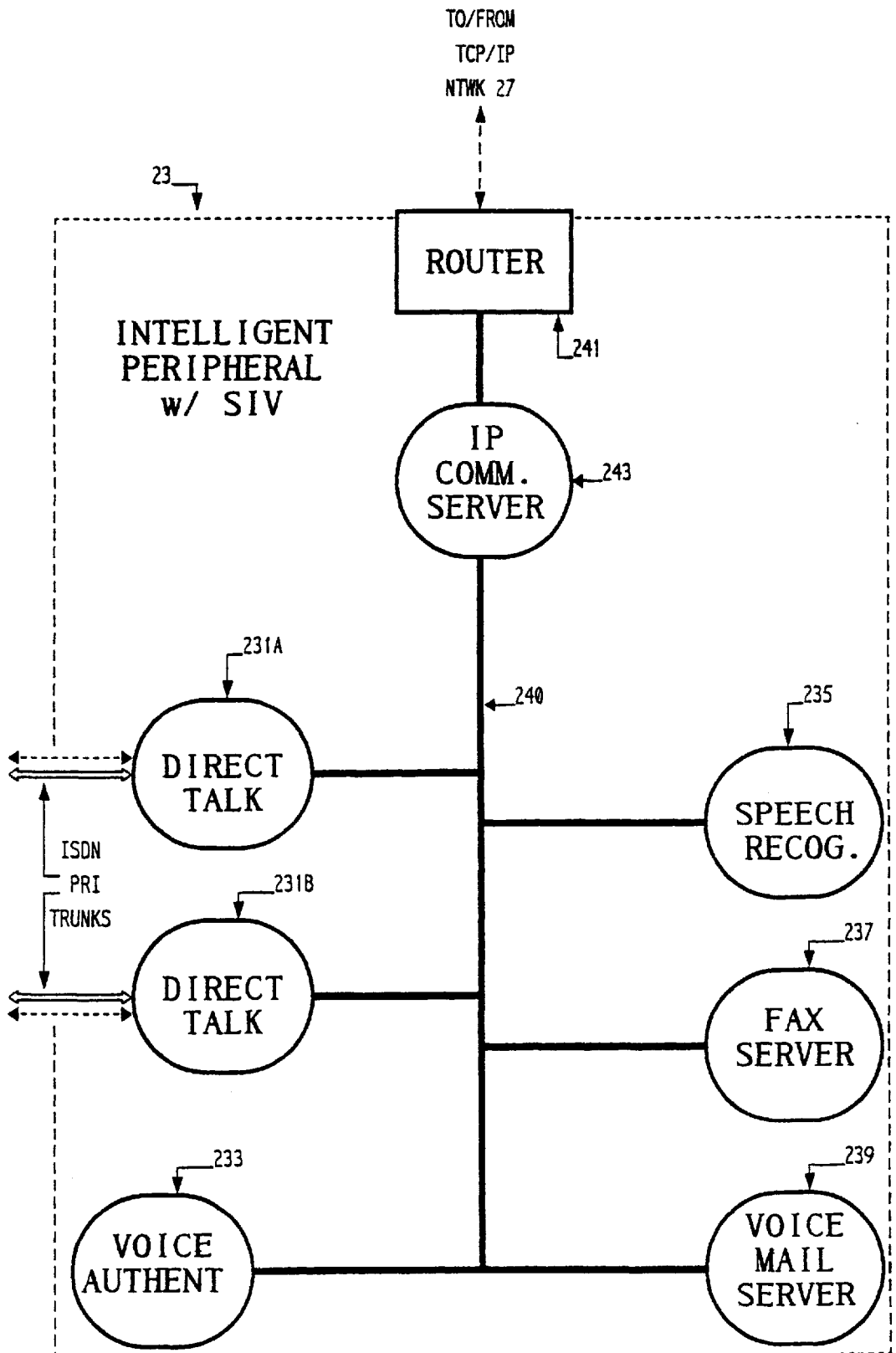
FIG. 3 is a simplified block diagram illustrating the significant functional components of an Intelligent Peripheral (IP) used in the network of FIG. 1.

A variety of adjunct processor systems known in the telephone industry can be used as the IP 23. The critical requirements are that the IP system process multiple calls and perform the subscriber identification functions, preferably by speaker identification and authentication. FIG. 3 is a functional diagram illustration of an IP 23 for performing the subscriber identification functions, possibly by dialed digit input and preferably by analysis and recognition of speech.

The preferred IP architecture utilizes separate modules for different types of services or functions, for example, one or two Direct Talk type voice server modules 231A, 231B for interfacing ISDN PRI trunks to the SSP central office(s) 11. Separate modules 233, 235 perform voice authentication and speech recognition. The IP 23 includes a variety of additional modules for specific types of services, such as a server module 237 for fax mail, and another server 239 for voice mail services. The various modules communicate with one another via an internal data communication system or bus 240, which may be an Ethernet type local area network.

Each Direct Talk module 231A or 231B comprises a general purpose computer, such as an IBM RS-6000, having digital voice processing cards for sending and receiving speech and other audio frequency signals, such as IBM D-talk 600 cards. Each voice processing card connects to a voice server card which provides the actual interface to T1 or primary rate interface ISDN trunks to the switching office. In the PRI implementation, the Direct Talk computer also includes a signaling card, providing two-way signaling communication over the D-channel of the PRI link. Each Direct Talk computer also includes an interface card for providing two-way communications over the internal data communications system 240.

The voice processing cards in the Direct Talk modules 231A, 231B provide voice message transmission and dialed digit collection capabilities. The modules 231A, 231B also perform the necessary line interface functions for communications to and from those servers which do not incorporate actual line interfaces. For example, for facsimile mail, a Direct Talk module 231 connected to a call would demodulate incoming data and convert the data to a digital format compatible with the internal data communication network 240. The data would then be transferred over network 240 to the fax server 237. For outgoing facsimile transmission, the server 237 would transfer the data to one of the Direct Talk modules over the network 240. The Direct Talk module 231 would reformat and/or modulate the data as appropriate for transmission over the ISDN link to the switch 11.

The Direct Talk modules provide a similar interface function for the other servers, such as the voice mail server 239, the speech recognition module 235 and the voice authentication module 233. For incoming speech signals, the Direct Talk module connected to a call receives digital speech signals in the standard pulse code modulation format carried on a B-channel of an ISDN link. The Direct Talk module reformats the speech data and transmits that data over the internal network 240 to the server or module performing the appropriate function, for example to the authentication module 233 for analysis and comparison of features to stored templates or feature data for known subscribers.

In the outgoing direction, the currently connected Direct Talk module may play an announcement from memory, e.g. to prompt a caller to say their name. Alternatively, the Direct Talk module may receive digitized speech over the network 240 from one of the other modules, such as a stored message retrieved from voice mail server 239. The Direct Talk module reformats the speech signal as needed for transmission over the ISDN B-channel to the caller.

The illustrated IP also includes a communication server 243. The communication server 243 connects between the data communication system 240 and a router 241, which provides communications access to the TCP/IP network 27 that serves as the second signaling communication system. The communication server 243 controls communications between the modules within the IP 23 and the second signaling communication system. The server 243 and the router 241 facilitate communication between the elements of the IP 23 and the SCP 19. The IP may also use this communication system to communicate with other IP's, for example to send subscriber voice template information to the remote IP $23_R$ (FIG. 1) or to receive such information from that IP or some other network node.

The personal dial tone service relies on the voice authentication module 233 to perform the necessary speaker identification/verification function. For the identification and authentication of subscribers, the voice authentication module 233 within the IP 23 stores a template or other feature or voice pattern information for each person who has the personal dial tone service in the area that the IP services. For example, if the subscriber utilizes the personal dial tone service from a particular line, such as a shared line in an incarceration facility or a dormitory or the like, the IP stores the subscriber's voice pattern information in a file associated with the office equipment (OE) number of the particular line. If the IP 23 serving a call does not store the template or feature data for a particular subscriber, the IP 23 may obtain subscriber identification by dialed digit input and then obtain a copy of the template or feature data from a remote IP $23_R$ via communication through the TCP/IP network 27, in order to authenticate the subscriber's identity.

Using current technology, a new subscriber or detainee would get on line with the IP serving that subscriber and 'train' that IP by speaking certain words and phrases. From the received audio signals representing those words and phrases, the IP would store templates or other pattern information for use in identifying and/or verifying that a caller is the particular subscriber or detainee.

During actual call processing, the voice authentication module 233 receives speech information from the caller. The voice authentication module 233 compares the received information to its stored template or feature data to identify a calling party as a particular subscriber or detainee.

The present invention also relies on the speech recognition capability of the module 235, particularly in processing of incoming calls in certain situations. The speech recognition module 235 enables the IP to analyze incoming audio information to recognize vocabulary words. The IP 23 interprets the spoken words and phrases to determine subsequent action. For example, the IP might recognize the caller speaking the name of a called subscriber or detainee and use the subscriber or detainee identification to instruct the terminating central office to control the call in accord with that subscriber or detainee's profile.

The preferred routing of the calls in accord with the invention utilizes AIN type call processing. To understand the call processing, it may be helpful to consider several specific examples in more detail.

In a first example, consider an outgoing call from the station $1_A$ to the station $1_B$ Assume per call assignment of profile data to the originating line, for personal dial tone service on each outgoing call. FIG. 4 provides a simplified flow diagram of the signal flow and processing for such an outgoing call.

Assume use of a standard telephone for purposes of this example. The person lifts the handset creating an off-hook state in the telephone $1_A$, and a corresponding signal or change in state on the line to the central office 11 (step S1). In this call flow, the off-hook signal is a type of service request, i.e. a request to make an outgoing call. The serving central office $11_1$ detects the off-hook and commences its call processing. Specifically, the central office assigns a register in the call store 67 to this call and loads profile information associated with the off-hook line from the disc storage 63 into the assigned register. In this case, the central office 11, is an SSP capable office, and the loaded profile data indicates an off-hook immediate trigger set against the particular line. The serving SSP type office $11_1$ therefore detects this off-hook PIC as an AIN trigger (step S2).

In response to the off-hook and the off-hook trigger set in the subscriber's profile, the SSP type central office switch $11_1$ launches a query to the SCP 19 (step S3). Specifically, the SSP $11_1$ creates a TCAP query message containing relevant information, such as the office equipment (OE) number assigned to the off-hook line, and transmits that query over an SS7 link to one of the STPs 15. The query includes a destination point code and/or a global title translation addressing the message to the SCP 19, and the STP 15 relays the query message over the appropriate link to the SCP 19. The query from the SSP central office $11_1$ identifies the caller's line by its associated office equipment (OE) number and possibly by a single telephone number associated with the off-hook line.

In response to a query, the SCP 19 accesses its a database, typically, the MSAP database set up in the ISCP, to determine how to process the particular call. The SCP 19 identifies an access key in the query and uses the key to retrieve the appropriate record from the database. In this case, the query indicates an off-hook trigger as the trigger event, therefore the SCP 19 uses the calling party office equipment (OE) number as the access key. The SCP 19 retrieves a call processing record (CPR) corresponding to the office equipment (OE) number associated with the off-hook line and proceeds in accord with that CPR (step S4).

For the present example of the personal dial tone service, the CPR will provide information necessary for routing the call to some node of the network that will perform speaker identification/verification (SIV). In the preferred embodiment, the SIV is a function performed by an Intelligent Peripheral (IP), therefore the CPR provides information for routing the call to the nearest available IP having the SIV capability.

Based on the CPR, the SCP 19 formulates a response message instructing the SSP central office $11_1$ serving the customer to route the call. In this case, the message includes information, e.g. a office equipment (OE) number or telephone number, used for routing a call to the identified IP 23. The SCP 19 formulates a TCAP message in SS7 format, with the destination point code identifying the SSP office $11_1$. The SCP 19 transmits the TCAP response message back over the SS7 link to the STP 15, and the STP 15 in turn routes the TCAP message to the SSP central office $11_1$ (see step S5).

The SSP type switch in the central office $11_1$ uses the routing information to connect the call to one of the lines or channels to the IP 23. A two-way voice grade call connection now extends between the calling station $1_A$ and the IP 23 (step S6). In the present example, the switch actually connects the off-hook line to the line to the IP before providing dial tone.

As noted above, the communication link to the IP 23 provides both line connections and signaling, preferably over a primary rate interface (PRI) type ISDN link. When the central office $11_1$ extends the call from the calling party's line to a line circuit (over a B channel) to the IP 23, the switch in that office also provides call related data over the signaling link (D channel for ISDN). The call related data, for example, includes the office equipment (OE) number normally associated with the off-hook line and possibly the telephone number for that line.

In response to the incoming call, the IP 23 will seize the line, and it will launch its own query to the SCP 19 (step S7). In the preferred network illustrated in FIG. 1, the IP 23 and the SCP 19 communicate with each other via a separate second signalling network 27, for example utilizing either an 1129+ protocol or a generic data interface (GDI) protocol as discussed in U.S. Pat. No. 5,572,583 to Wheeler, Jr. et al. The query from the IP 23 again identifies the caller's line by at least its associated office equipment (OE) number.

In response to the query from the IP 23, the SCP 19 again accesses the appropriate CPR (step S8) and provides a responsive instruction back through the network 27 to the IP 23 (step S9). Although the IP 23 could passively monitor any speech that the user might utter, the preferred implementation utilizes a 'Challenge Phase' to prompt the user to input specific identifying information. In this case, the instruction causes the IP 23 to provide a prompt message over the connection to the caller (step S10). Here, the signal to the caller may be a standard dial tone or any other appropriate audio signal. Preferably, the instruction from the SCP 19 causes the IP 23 to provide an audio announcement prompting the caller to speak personal information. In one preferred example, in step S10 the IP plays an audio prompt message asking the caller, 'Please say your full name'. The process may ask for any appropriate identifying information.

The signal received by the IP 23 goes over the lines and through the central office switch(es) for presentation via the off-hook telephone $1_A$ to the calling party. In response, the caller will speak identifying information into their off-hook telephone, and the network will transport the audio signal to the IP 23 (step S11).

As noted above, an IP 23 can provide a wide range of call processing functions, such as message playback and digit collection. In the preferred system, the IP also performs speaker identification/verification (SIV) on the audio signal received from the off-hook telephone in step S11. When the IP 23 receives speech input information during actual call processing, for this service example, the IP analyzes the speech to extract certain characteristic information (step S12).

The IP 23 stores a template or other voice pattern information for each person who has the personal dial tone service in the area that the IP normally services. If the IP 23 does not store the particular template or feature information it needs to process a call, the IP 23 can communicate with a remote IP $23_R$ to obtain that information. In the present shared line example, the IP 23 will store template or feature data for each subscriber or detainee associated with the particular off-hook line.

When the IP 23 receives input speech and extracts the characteristic information during actual call processing, the IP compares the extracted speech information to stored pattern information, to identity and authenticate the particular caller. In the present example, the voice authentication module 233 in the IP 23 compares the extracted speech information to the stored template or feature data for each subscriber associated with the particular off-hook line.

In step S13, the IP 23 determines if the information extracted from the speech input matches any of the stored template data feature data for an identifiable subscriber or detainee (within some threshold level of certainty). If there is a match, the IP now knows the identity of the calling subscriber or detainee. Based on the identification of the calling subscriber or detainee, the IP 23 selects a virtual office equipment (OE) number from storage that corresponds to the subscriber or detainee.

The IP 23 formulates a D-channel signaling message containing the virtual office equipment (OE) number together with an instruction to load that OE number into the register assigned to the call in place of the OE number of the off-hook line. The IP 23 supplies the message to the SSP central office switch $11_1$ over the D-channel of the ISDN PRI link (step S14). In response, the administrative module processor 61 rewrites the OE number in the register assigned to the call using the OE number received from the IP 23.

Upon rewriting the OE number in the register, the administrative module processor 61 of central office switch $11_1$ also reloads the profile information in the register (step S15). Specifically, the administrative module processor 61 retrieves profile information associated with the virtual office equipment (OE) number from the disc storage 63 into the register. As such, the profile information in the assigned register in the call store 67 now corresponds to the identified subscriber or detainee, rather than to the off-hook line.

The profile information provides a wide range of data relating to the subscriber or detainee's services. The profile data provides necessary billing information, enabling billing from the call to this particular subscriber or detainee for a personal call and/or billing to the incarceration supervision entity. The profile also defines various service features and restrictions applicable to this subscriber or detainee on outgoing calls, such as three-way calling in the case of an allowed service, and prohibited and/or allowable calls in the case of a detainee. The profile may also include a list of key words for which monitoring is maintained during calls. The profile may define a class of calling service available to the subscriber or detainee. In a dormitory example, the caller may be allowed a set dollar amount for long distance calls per month (e.g. $50.00). The profile data will indicate the remaining amount at the time of the call and will cause the switch to interrupt service when the available amount is exhausted. Long distance calls are usually proscribed in the case of detainees. To this end the key word list may contain credit card names and DTMF sequences which precede long distance calls. Other class of service restrictions might enable long distance calls only if collect and/or only if calling one or two specified numbers (e.g. only to the parents' house) in the dormitory situation. The class of service might enable only long distance calls within a region or country but not international calls.

In the presently preferred implementation, when the central office switch $11_1$ reloads the profile, the central office disconnects the link to the IP 23 and connects tone receivers to the caller's line. Optionally, the central office $11_1$ may provide a 'dial tone' or other message over the line (step S16). The caller now dials digits in the normal manner (step S17), and the switch in the central office $11_1$ loads the dialed digits into the assigned register within the call store 67. The central office $11_1$ utilizes the dialed digits and the subscriber's profile data to process the call (S18). For example, if the dialed digits represent a call within the subscriber's permitted class of service, the switch completes the call to the destination station $1_B$ using the dialed digits in the normal manner. If the profile data requires a particular billing treatment, e.g. to bill a long distance call to the subscriber, the switch makes the appropriate record and forwards the record to the exchange carrier company's accounting office equipment. In accord with another aspect of the invention, the network provides caller ID data naming the identified subscriber or detainee to the destination station.

The processing to complete the call, performed in step S18, actually involves a sequence of steps. Of particular note, some of these steps facilitate delivery of caller ID information to the destination station. The present invention involves delivering caller ID information which corresponds to the identified subscriber or detainee, preferably the subscriber or detainee's name, rather than simply the number of the line or station from which the subscriber or detainee initiates the call. Two processing methodologies are envisioned for providing this calling subscriber or detainee ID feature, one involving access to name information in a central database such as LIDB and the other relying on name data from the subscriber or detainee's profile.

Figure 4A:
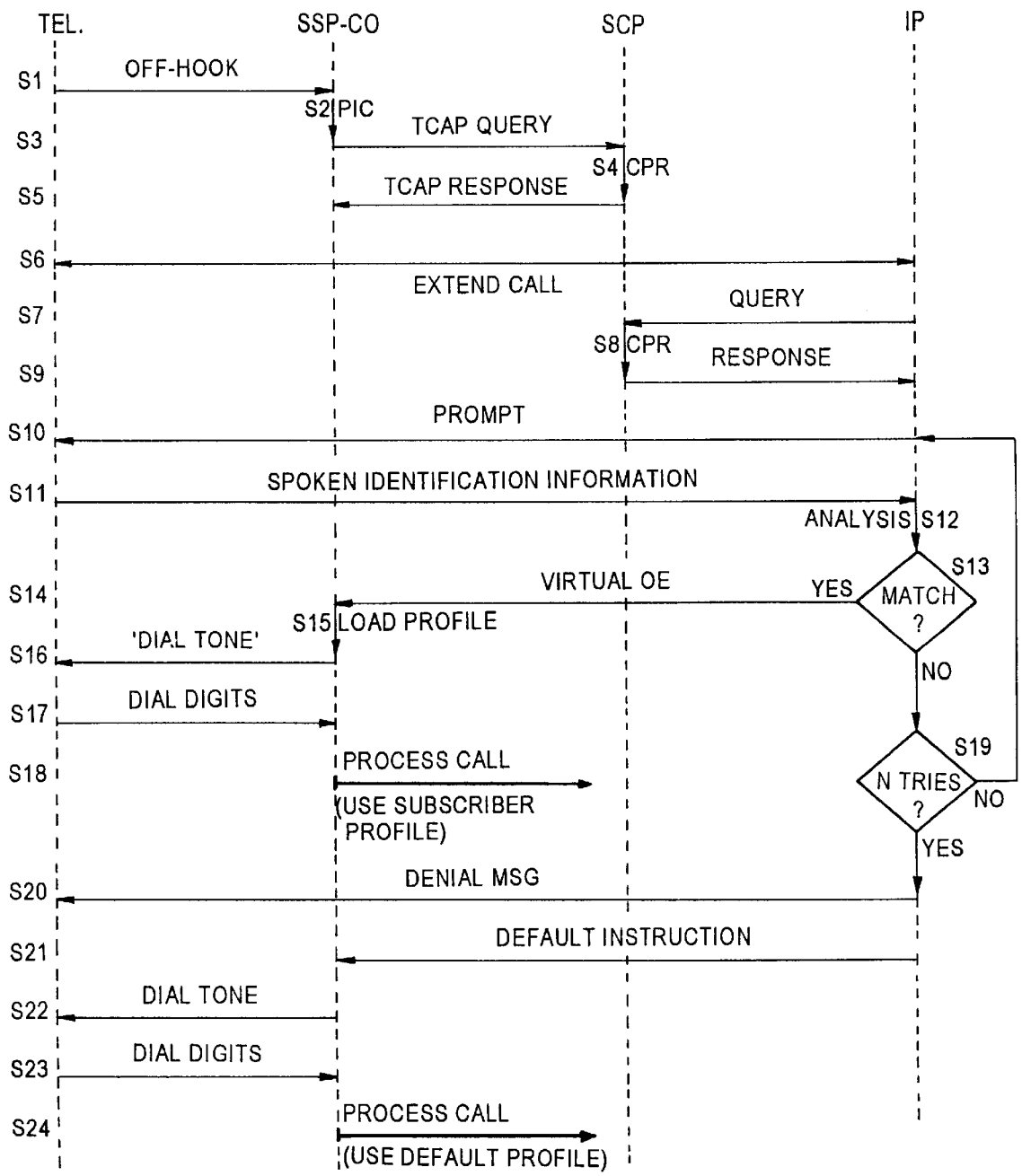
FIG. 4A is a combination signal flow and process flow diagram useful in understanding a specific example of call processing for providing the personal dial tone service over a shared use line.
Figure 4B:
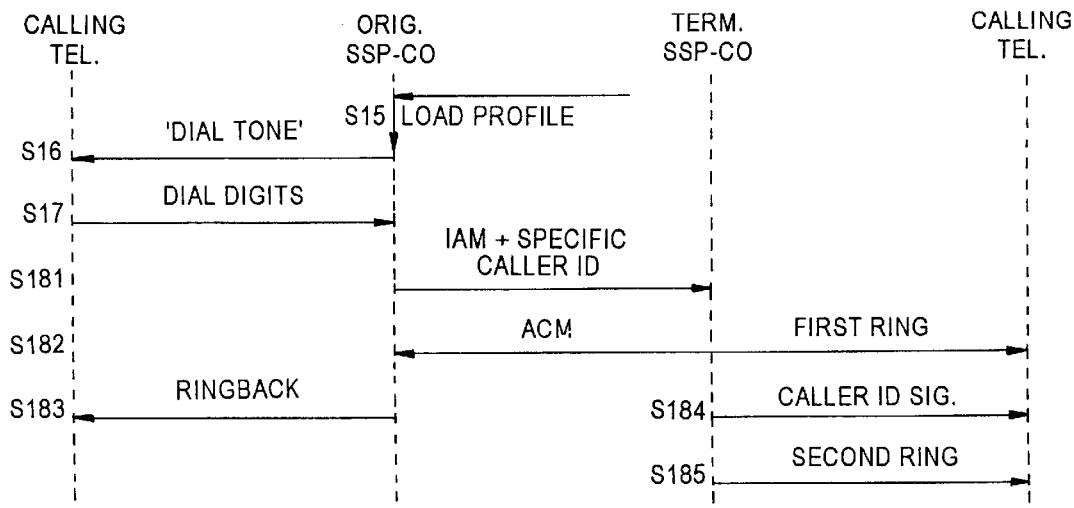
FIGS. 4B is a combination signal flow and process flow diagram useful in understanding a first embodiment of the processing for providing the identity of the actual caller to the destination display as caller ID information.

FIG. 4B is a simplified process and signal flow diagram, illustrating the call completion operations, including caller ID display using data from the profile. The network performs the steps depicted in FIG. 4B after identification of the subscriber or detainee, preferably based on speaker identification/verification (SIV). As discussed earlier, the IP 23 supplies the signaling message containing the virtual office equipment (OE) number and the instruction to load that OE number into the assigned register to the SSP central office switch $11_1$ over the D-channel of the ISDN PRI link (step S14). In response, the administrative module processor 61 rewrites the OE number in the register and reloads the profile information in the register (step S15).

The central office $11_1$ provides dial tone or the like over the line (step S16), the caller dials digits corresponding to the desired destination (step S17), and the switch in the central office $11_1$ begins its processing to route the call through the network. Initially, the central office $11_1$ uses the dialed number to initiate a CCIS communication with the exchange serving the intended destination, in the example the terminating central office $11_N$.

Specifically, the subscriber or detainee's serving central office $11_1$ generates an Initial Address Message (IAM) for transmission to the terminating central office $11_1$ (S181). The IAM message includes the SS7 destination point code (DPC) of the terminating central office $11_N$ and the SS7 origination point code (OPC) of the customer's serving-end central office $11_1$, for addressing purposes. The payload portion of the IAM message includes the called and calling numbers. In accord with the invention, the originating end office $11_1$ reads name data from the identified subscriber's profile, currently loaded in the assigned register, and places that data in additional field of the IAM message or in an accompanying information message addressed in the same manner as the IAM message. The originating central office transmits the IAM message and possibly an accompanying information message through the CCIS network to the distant terminating office $11_N$ (step S181).

When the terminating office $11_N$ receives the IAM message, the administrative module processor for that office retrieves the customer profile for the number in the destination number field of that message (e.g. the number for the telephone $1_B$) from its mass storage system and loads that profile into one of its call store registers. If the called party has an enhanced caller ID service, with name display, the terminating central office $11_N$ would normally recognize the attempt to complete to that party's number message as a terminating attempt trigger (TAT) type point in call (PIC) to trigger access to the LIDB database for name information. However, in this embodiment of the invention, the terminating end office detects the receipt of the subscriber's name data with the IAM message, therefore the administrative module processor in that office overrides the trigger.

The terminating central office switching system $11_N$ transmits an Address Complete Message (ACM) back to the central office $11_1$ and if the called line is available applies ringing signal to the called party's line (S182). The ACM includes a variety of information, including a calling party status indicator, e.g. line free or busy. If the line is not busy, the end office 13 rings the station Y corresponding to the dialed digits 703-333-5678, and generates the appropriate indicator in the Address Complete Message (ACM) to indicate that it received the request for a call and that the number is not busy. The ACM message is sent back by simply reversing the point codes from the IAM message. Now the destination point code (DPC) is the point code of the central office $11_1$ and the origination point code (OPC) is the point code of the central office 13. In response to the ACM message, if the called line is available, the originating central office 11 applies a ringback tone signal to the line to the calling station $1_A$ (S183).

As part of its operations to ring the called telephone station, the terminating central office $11_N$ transmits a caller ID signal over the line. If the called party has ISDN service or the like, the switch sends a signaling message along with the ringing signal. If the called party has analog telephone service, the switch $11_N$ transmits a caller ID message (step S184) as frequency shift keyed (FSK) data inserted in the silent interval between the first ringing signal (step S182) and the second ringing signal (S185) applied to the called party's line.

In accord with the invention, the caller ID message applied to the called party's line includes the telephone number associated with the calling station $1_A$ and at least some additional data specific to the identified subscriber. If the called party has enhanced caller ID for displaying name data, the ISDN telephone or the caller ID terminal $5_B$ receives the number and the name data received with the IAM message in step S181. The caller ID terminal $5_B$ or a display device in the ISDN telephone displays the received number and name information, identifying the actual calling party, for review before the called party chooses to answer the call.

If the called party subscribes only to normal caller ID, the end office switch $11_N$ can transmit only a limited amount of information. For this purpose, the switch will select and transmit one or two characters from the subscriber identification data along with the telephone number. For example, if four persons normally call from the particular originating telephone station or line, the data sent to the terminating central office $11_N$ might include a letter or number identifying each subscriber. The switch $11_N$ would transmit that letter or number with the telephone number in the caller ID message for display.

If someone answers the telephone station $1_B$, the terminating central office switching system $11_N$ detects an off-hook condition (S13) and sends an Answer Message (ANM) back to the originating central office $11_1$ through one or more of the STPs 15. The ANM message indicates that the called telephone $1_B$ was picked up. Also, at that time the actual telephone traffic trunk circuit is connected together between the central offices $11_1$ and $11_N$. The central offices 11 connect the lines to the stations to the respective ends of the trunk circuit, to complete the voice path. At this point, actual voice communication is established between the calling station $1_A$ and the called station $1_B$. Communication continues until one or both parties hang up, at which time, all of the switched connections are torn down.

Figure 4C:
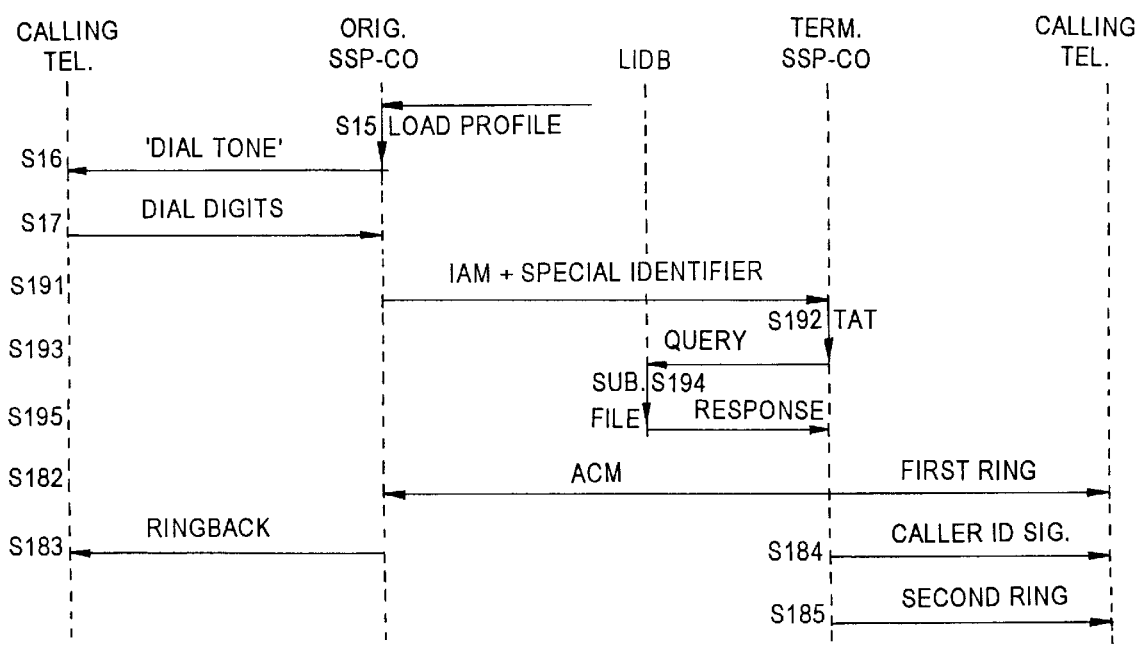
FIGS. 4C is a combination signal flow and process flow diagram useful in understanding another embodiment of the processing for providing the identity of the actual caller to the destination display as caller ID information.

FIG. 4C is a simplified process and signal flow diagram, illustrating the call completion operations including, caller ID display involving access to name information in a central LIDB database. The network performs the steps depicted in FIG. 4C after identification of the subscriber, preferably based on speaker identification/verification (SIV). As in the example of FIG. 4B, the central office switch $11_1$ receives an instruction containing the subscriber's virtual office equipment (OE) number (step S14), loads the corresponding profile information in the register (step S15) and sends dial tone or the like over the line (step S16). The subscriber dials digits corresponding to the desired destination (step S17), and the switch in the central office $11_1$ transmits an IAM message through the interoffice signaling network to the terminating central office $11_N$. The information sent in or with the IAM message in step S191, however, is different than in the earlier example.

In this embodiment, the originating end office $11_1$ reads a short code identifier from the identified subscriber's profile, currently loaded in the assigned register, and places that identifier in additional field of the IAM message or in an accompanying information message addressed in the same manner as the IAM message. For example, if the network provides personal dial tone service to four identified persons associated with the originating telephone $11_1$, the short code might comprise a number from zero to three or letters such as A, B, C and D, identified by the state of two bits in the IAM or accompanying information message.

As in the earlier example, the originating end office $11_1$ addresses and transmits the IAM message with the specific subscriber identifier code through the SS7 signaling network for receipt by the terminating office $11_N$. If the called party has only normal caller ID service, then the terminating office $11_N$ would transmit a normal caller ID message to the destination, with the identifier appended to the calling party telephone number as an extra digit or character. If the called party often receives calls from this subscriber, even the limited subscriber specific identification provided by the code will enable the called party to recognize that the current call is from the identified subscriber.

FIG. 4B depicts the processing steps, beginning in step S192, for processing a call to a called customer having the enhanced caller ID service for name and number display. In such a case, when the terminating office $11_N$, the administrative module processor in that office loads the profile for the called subscriber's telephone number into a register in the call store assigned to this call. Of particular note, because the called customer has the enhanced name and number type caller ID service, the customer profile record establishes a terminating attempt trigger (TAT) against the that customer's telephone number.

At this point, the terminating office $11_N$ recognizes the called party telephone number in the destination number field of the IAM message as a terminating attempt trigger (TAT) type point in call or PIC (step S192). In response to this PIC, the terminating office $11_N$ launches a second query message through one or more of the STP(s) 15 to the LIDB database 21 (step S193). The query message includes both the telephone number associated with the calling station $1_A$ or its telephone line as well as the code identifying the specific subscriber or detainee making that call.

The LIDB database 21 uses the calling party telephone number and the code identifying the specific subscriber or detainee, received in the query, to retrieve that one subscriber or detainee's account file record from the database (step S194). The query also indicates the cause of the query, i.e. the TAT triggering event. From this information, the LIDB database recognizes that the query is a request for name information. The database 21 therefore reads up to 15 characters of name data from the subscriber or detainee's account file. The LIDB database 21 compiles a TCAP call control message including the name data and returns that call control message to the terminating central office $11_N$ via the SS7 network.

The terminating central office switching system $11_N$ receives the call control message from the LIDB database 21.

To provide the caller ID service in this embodiment, the terminating end office $11_N$ combines the name data from the call control message together with the calling party number as two caller ID messages. The end office $11_N$ then signals the originating office $11_1$ and initiates ringing of the called party's line, as discussed in more detail below.

Assuming for this discussion that the called line is available, the terminating central office switching system $11_N$ transmits an Address Complete Message (ACM) indicating availability back to the central office $11_1$ and applies ringing signal to the called party's line (step S182). In response to the ACM message, if the called line is available, the originating central office 11 applies a ringback tone signal to the line to the calling station $1_A$ (S183)

As part of its operations to ring the called telephone station, the terminating central office $11_N$ transmits a caller ID signal over the line. If the called party has ISDN service or the like, the switch sends the caller ID signaling messages along with the ringing signal. If the called party has analog telephone service, the switch $11_N$ transmits the caller ID messages sequentially over the line (step S184) as frequency shift keyed (FSK) data inserted in the silent interval between the first ringing signal (step S182) and the second ringing signal (S185) applied to the called party's line. As in the earlier example, the display provides the telephone number associated with the calling station $1_A$ as well as the name data for the specifically identified calling subscriber or detainee.

In the shared line example, each person normally expected to use the line to station $1_A$ is a different subscriber to the personal dial tone service. As the subscribers or detainees make outgoing calls, they each receive their own individualized service over the line on each separate call, in precisely the manner described above relative to steps S1 to S18 and the personal caller ID as described above relative to FIGS. 4B and 4C. For example, each subscriber or detainee may receive a different level of calling privileges and/or class of service based on their ability and/or desire to pay for telephone services. Likewise each detainee may receive a different level of restriction based upon court determined conditions. Also, the called party receives caller ID information including both the origination telephone number and the name or other identifying information associated specifically with the calling subscriber or detainee.

Returning to step S13 in FIG. 4A, the extracted information characterizing the input speech signals may not match any of the templates or feature data used by the IP 23. In this event, the process flows to step S19. The IP will count the number of tries or attempts to identify the subscriber and permit some maximum number of failed attempts (N). Assume, for example, that the software allows only two identification attempts on one call (N=2). On the first failure, the number of tries is less than N, therefore processing returns to step S10, and the IP 23 again transmits the prompt for speech input. The caller again speaks the requested input information (S11), and the authentication module 233 again analyzes the input information (S12). If the second input adequately matches a stored subscriber's information in step S13, the processing flows through steps S14 to S18 to complete the call as described above.

However, if the extracted speech information does not match a stored subscriber template or feature data, processing again flows to step S19. If the number of tries now corresponds to the limit N, for example on the second failed attempt, the processing branches to step S20. The IP 23 may now transmit a message indicating denial of service, although this is optional. In the case of detainees the IP 23 also transmits a message indicating failure of identification and denial of service to the supervising authority central data node.

The IP 23 formulates a D-channel signaling message instructing the central office switch $11_1$ to process the call in accord with default conditions and transmits that instruction to the central office switch (step S21). The instruction could include a default OE number corresponding to a default profile, or the message could instruct the switch to proceed using the OE and profile data for the off-hook line itself. The IP 23 supplies the message to the SSP central office switch $11_1$ over the D-channel of the ISDN PRI link (step S21). The administrative module processor 61 resumes call processing using the appropriate default OE and profile. In the case of detainees, the default profile may set up a call to a live attendant in order to obtain additional information which may indicate a problem in incarceration conditions. In all identification failures involving detainees records are maintained in the supervisory data node and an alarm condition may be signaled.

In the preferred embodiment, the switch provides a normal dial tone (S22), collects dialed digits from the caller (S23) and processes the call (S24). However, the default profile provides only some limited class of service, for example only emergency 911 service. The default call processing provides no additional information from the profile corresponding to any particular subscriber or detainee, therefore the network processes the call as a normal call for caller ID purposes. The caller ID service will provide only the telephone number to callers having normal caller ID, and the network will access LIDB database 21 to provide name information if any name is associated strictly with the telephone number, essentially in the manner that the network provides such services when there is no personalized dial tone service involved. In the detainee situation the caller ID signaling may include an alarm indication.

In the above example, the network disconnected the IP 23 after identifying the subscriber or detainee and providing the subscriber or detainee's virtual OE number to the serving central office 11. For some applications of the personal dial tone service, particularly in the case of home incarceration, the central office 11 would maintain a bridged connection of the IP 23 on the line, to enable the IP to monitor the call. For example, in a detainee telephone service, each detainee typically would have only limited telephone rights as specified in each detainee's profile data. To prevent one detainee from selling their telephone service rights to another detainee, the IP 23 would periodically or constantly monitor the outgoing speech signals from the incarceration facility line.

The voice authentication module 233 would initially identify the detainee subscriber as discussed above, and would periodically recheck to authenticate the identity of the party using the line. If the voice authentication module detects some other party using the line or did not detect the identified subscriber or detainee's speech for some predefined time interval, the IP 23 would instruct the serving central office switch 11 to disconnect the call. The IP 23 may send messages to the switch or to other network elements to initiate additional action, such as profile modification to further limit a particular detainee's telephone privileges and/or to notify incarceration authorities of misuse of telephone privileges.

The first detailed example discussed above related to personal dial tone service provided on a per-call basis on a shared use line. Several known subscribers or detainees may routinely use their personal dial tone service over the same line. As noted earlier, an alternate form of the personal dial tone service can be activated on a dial-up basis. Consider now an example of a dial-up activation for a single call.

Figure 5:
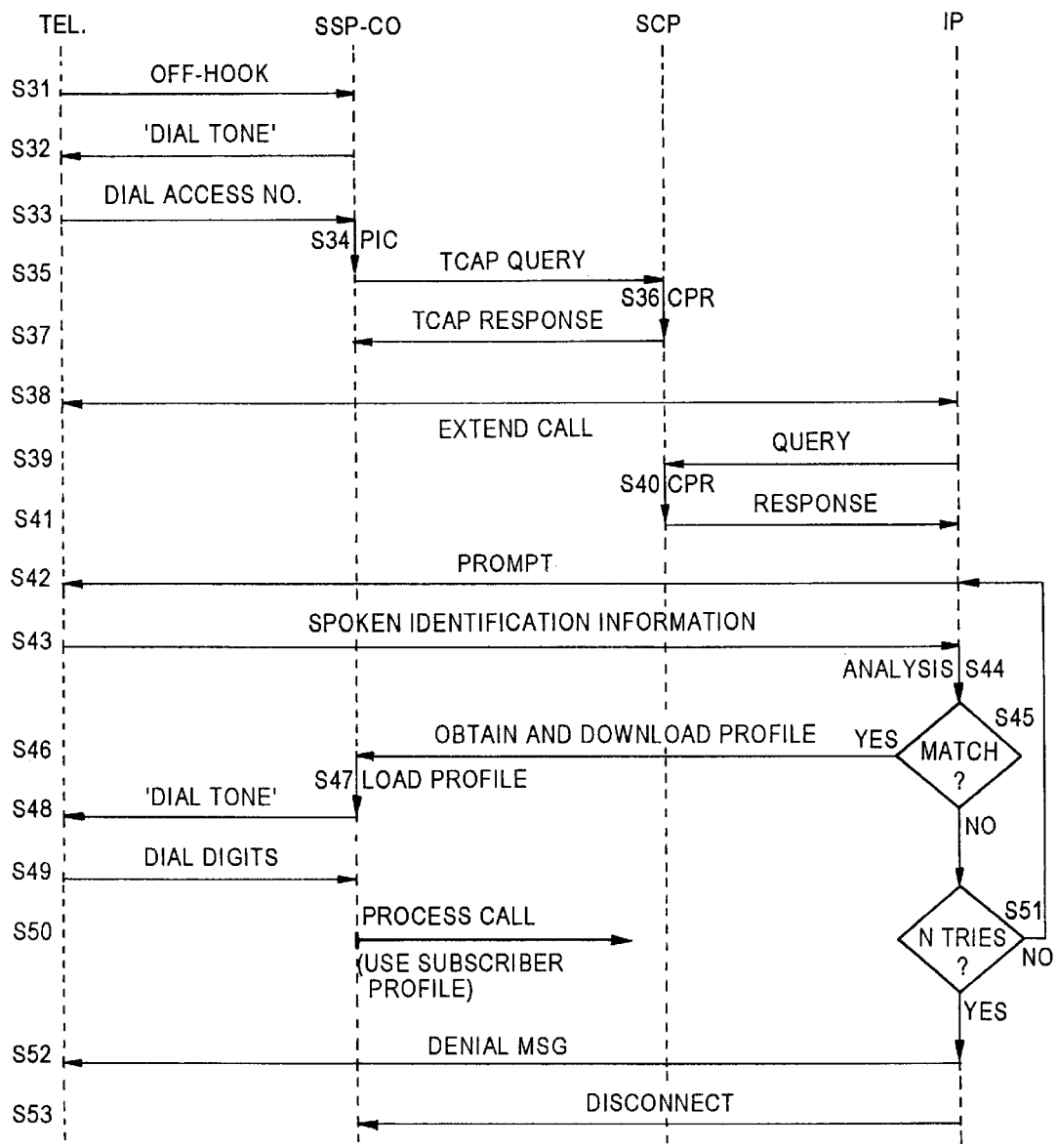
FIG. 5 is a combination signal flow and process flow diagram useful in understanding a specific example of call processing for providing the personal dial tone service on a dial-up, per call basis.

For this example, assume that a subscriber or detainee's normal or 'home' telephone is telephone $1_B$. The end office switch $11_N$ stores the subscriber or detainee profile data for the line associated with that telephone station. Now assume that the subscriber or detainee is using station $1_A$ connected through a telephone line to central office $11_1$. FIG. 5 provides a simplified flow diagram of the signal flow and processing for such a call.

The subscriber lifts the handset creating an off-hook state in the telephone $1_A$ and a signal to office 11 (step S31). The serving central office $11_1$ detects the off-hook and commences its call processing. Specifically, the central office assigns a register in the call store 67 to this call and loads profile information associated with the off-hook line from the disc storage 63 into the register. In this case, the profile data associated with the line does not provide an off-hook trigger because the line is not specifically associated with the shared use type personal dial tone service discussed above. The central office $11_1$ therefore provides dial tone in the normal manner (step S32).

If making a normal call, the caller would dial a destination number, and the network would complete the call as dialed. To activate the personal dial tone service, however, the subscriber dials an access number assigned to that service, such as 1-800-DIALTON, from the station $1_A$ (step S33).

The dialing of an outgoing call, in this case to the access number, is another type of service request. The central office switch $11_1$ recognizes the dialed access number as a trigger event or 'PIC' (step S34). The SSP type central office $11_1$ creates a TCAP query message containing relevant information, such as the office equipment (OE) number and/or telephone number assigned to the off-hook line, the dialed number and the type of triggering event. The office $11_1$ transmits that query to the SCP 19 (step S35). Specifically, the SSP central office $11_1$ transmits the query over an SS7 link to one of the STPs 15. The query includes a point code and/or a global title translation addressing the message to the SCP 19, and the STP 15 relays the query message over the appropriate link to the SCP 19.

In response to a query, the SCP 19 accesses its database to determine how to process the particular call. In this case, the query indicates the dialed number type trigger and provides the digits of the specific number dialed. The SCP 19 uses the dialed number as the access key. The SCP 19 retrieves a call processing record (CPR) corresponding to that number associated with the personal dial tone access function (step S36). For the current exemplary access, the CPR will provide information necessary for routing the call to the IP 23 that will perform the necessary speaker identification/verification (SIV).

Based on the CPR, the SCP 19 formulates a response message instructing the SSP central office $11_1$ serving the customer to route the call. In this case, the message includes information, e.g. a office equipment (OE) number or telephone number, used for routing a call to the identified IP 23. The SCP 19 formulates a TCAP response in SS7 format and transmits the TCAP response message back to the SSP central office $11_1$ (see step S37).

The SSP type switch in the central office $11_1$ uses the routing information to connect the call to a line or channel to the IP 23. A voice grade call connection now extends between the calling station $1_A$ and the IP 23 (step S38).

The central office $11_1$ provides a signaling message to the IP 23 with the call. In this case, the signaling message includes the dialed digits indicating a call to the personal dial tone access number. The signaling message also includes either the office equipment number or the telephone number of the line to the calling station $1_A$.

As in the earlier example, the IP 23 will seize the line for the incoming call and launch a query to the SCP 19 through the TCP/IP network 27 (step S39). The SCP 19 accesses an appropriate CPR (S40), and based on that CPR, the SCP 19 transmits back a message (S41) instructing the IP 23 to execute a program or script for the dial-up access to the personal dial-tone service.

The IP initially plays a greeting and a prompt message (S42) and collects spoken input information (S43). The IP 23 may also play a prompt and collect digits representing the subscriber's normal or home telephone number. The voice authentication module 233 analyzes the spoken identification information to extract characteristic information (S44) and compares the extracted information to stored template or feature data to determine if there is an adequate match to the known subscriber data (S45), as in the earlier example.

In step S45, the IP 23 determines if the information extracted from the speech input matches any of the stored template data feature data for an identifiable subscriber. If there is a match, the IP now knows the identity of the calling subscriber. Based on the identity of the subscriber, the IP 23 obtains the subscriber's profile data from the central office $11_N$ serving the subscriber's home telephone line. If the IP 23 is in direct signaling communication with the home central office $11_N$, for example via an ISDN D-channel or an SMDI link, the IP 23 may directly request and receive the profile data over the signaling link. If the IP and the switch are not in direct communication, the IP may provide a message notifying the SCP 19, and the SCP 19 would obtain the data from the switch and provide it back to the IP 23.

The IP 23 formulates a D-channel signaling message containing the subscriber's profile information together with an instruction to load that information into the register assigned to the call in place of the profile information corresponding to the off-hook line (step S46). The IP 23 supplies the message to the SSP central office switch $11_1$ over the D-channel of the ISDN PRI link. In response, the administrative module processor 61 rewrites the profile data in the register assigned to the call using the data from the IP 23 (step S47). As such, the profile information in the assigned register now corresponds to the identified subscriber.

When the central office switch $11_1$ reloads the profile, the central office disconnects the link to the IP 23 and connects tone receivers to the caller's line. The central office $11_1$ may also provide a standard dial tone or other message over the line (step S48). The caller can now dial digits in the normal manner (step S49), and the switch in the central office $11_1$ will load the dialed digits into the assigned register within the call store 67. The central office $11_1$ utilizes the dialed digits and the subscriber's profile data to process the call (step S50). For example, the switch in central office $11_1$ may provide the appropriate record to bill the outgoing call to the subscriber's account. In accord with the invention, the network also provides the subscriber specific information for caller ID purposes, in the manner discussed in detail above relative to either FIG. 4B or FIG. 4C.

As in the earlier example, the preferred embodiment allows up to N tries or attempts to provide recognizable subscriber identification information. Thus, if in step S45 the extracted information characterizing the input speech signals did not match any of the templates or feature data used by the IP 23, then the process flows to step S51. If the current number of attempts for recognition on this call is less than N, processing returns to step S42, and the IP 23 again transmits the prompt for speech input. The caller again speaks the requested input information (S43), and the authentication module 233 again analyzes the input information (S44). If the second input adequately matches a stored subscriber's information S45, the processing flows through steps S46 to S50 to complete the call as described above.

However, if the extracted speech information does not match a stored subscriber template or feature data, processing again flows to step S51. If the number of tries now corresponds to the limit N, the processing branches to step S52. The IP 23 preferably transmits a message indicating denial of service (S52), and then transmits a message to the central office $11_1$ signifying disconnection of the access call (S53). It should be noted that, in this example, normal service provided over the line to station $1_A$ is available on a subsequent call. The failure to recognize the caller as a personal dial tone subscriber only prevents the caller from using the personal dial tone services of a subscriber to that service, for example specialized billing of calls to that subscriber's account instead of to the account normally associated with the line to the calling station $1_A$.

In the above discussed dial-up access example, the dial tone service was personalized for a single outgoing call by temporarily loading the subscriber's profile data into the register assigned to the outgoing call in the originating central office $11_1$. The system can provide such service to the subscriber over any line or to any telephone station, including pay telephone stations. For this and other reasons such privilege to make outside calls is typically not granted to persons subject to home incarceration.

The present invention also enables activation of the personal dial tone service on a particular line for some predetermined period of time, for example to enable use of office or business services from some remote location while a business subscriber is out of the office. This type of operation involves an activation call requesting the service on a particular line for the desired period. Consider now an example of such a time activated service.

For this example, assume that a subscriber's normal business telephone is telephone $1_B$. The end office switch $11_N$ stores the subscriber profile data for the line associated with that telephone station. Now assume that the subscriber is using station $1_A$ connected through a telephone line to central office $11_1$ for business related communication services. The business related communication services include both incoming call related services and outgoing call related services.

To activate the personal dial tone service, the subscriber again lifts the handset at station $1_A$, receives dial tone from the central office 11, and dials the access number assigned to that service. The network uses AIN type processing to route the call to the IP 23, as in the example discussed above relative to FIG. 5.

As in the earlier examples, the IP 23 seizes the line for the incoming call and launches a query to the SCP 19 through the TCP/IP network 27. The SCP 19 transmits back a message instructing the IP 23 to play a greeting and a prompt message and collect and analyze spoken input information to identify and authenticate the subscriber. The instruction from the SCP 19 also causes the IP 23 to prompt the subscriber and obtain input information regarding the time period for service activation and possibly to obtain digits representing the subscriber's normal business telephone number. The process of calling the access number and interacting with the IP to activate the personal dial tone service on a line for the desired period is another type of service request.

For outgoing call processing, the IP 23 signals the central office $11_1$ serving the line to station $1_A$ to set an off-hook trigger in the profile data associated with that line. The IP also obtains the profile information from the switch $11_N$ serving the station $1_B$ and provides that information together with a virtual OE number to the central office $11_1$. The office $11_1$ stores the profile in its disc memory 63 in such a manner that the switch in that office can use the virtual OE number to retrieve that subscriber's profile. For incoming calls to the subscriber, the IP 23 transmits a signaling message to the subscriber's home office $11_N$ to set a terminating attempt trigger (TAT) against the line to the subscriber's office telephone $1_B$.

The IP 23 also transmits a message through the TCP/IP network 27 to the SCP 19 advising the SCP 19 of the service activation. This message identifies the subscriber, for example by their normal telephone number and identifies the telephone number and office equipment (OE) number associated with the line to station $1_A$ that the subscriber selected for their personal dial tone service.

In response to the message from the IP 23, the SCP 19 now establishes or modifies two CPRs for this subscriber. One CPR controls processing of calls to the subscriber's normal business telephone number to enable routing to the station $1_A$, and the other controls routing of outgoing calls from that station to the IP 23 for speaker identification/verification (SIV) processing.

Subsequently, when there is an outgoing call from the station $1_A$, the network will route the call to the IP 23 to determine if the caller is the subscriber or some other party, exactly as discussed in the per-call service from a shared use line (FIG. 4). As in that earlier example, if the IP identifies the caller as the personal dial tone subscriber, then the IP 23 provides the virtual OE number to enable loading of subscriber's profile from disc memory 63. The network provides the telephone number and the subscriber specific information, for caller ID purposes, as discussed above. If the IP determines that the caller is not the personal dial tone subscriber, the IP instructs the originating office $11_1$ to simply provide dial tone and complete the call in the normal manner. The central office $11_1$ therefore will utilize the office equipment (OE) number and profile information normally associated with the line, instead of those for the personal dial tone subscriber. The network provides caller ID service, identifying the number and possibly the main name associated with the line, in the normal manner. In this way, it is quite easy for the personal dial tone subscriber and the normal subscriber to both obtain their desired services on their respective calls via the same line, and to be correctly identified to called parties who subscribe to caller ID services.

The trigger set against the subscriber's normal telephone number and establishment of the CPR in the SCP 19 enables redirection of calls normally intended for the subscriber's business telephone $1_B$ to the line to station $1_A$. Depending on how the subscriber elects to define their individual service, the network may simply route the calls to the line to station $1_A$, as a normal AIN forwarded call that simply rings the station(s) $1_A$ on the line. Alternatively, the subscriber may elect an enhanced service which involves routing to the IP, IP prompting and speech recognition to identify the called subscriber and distinctive ringing over the line, in a manner analogous to that used for processing incoming calls in shared use applications, such as the above discussed dormitory example.

As noted above, the dial-up access procedure in this latest service example required the subscriber to specify a time period that the personal dial tone service should apply to the particular line. The IP 23 stores a record of the time period elected by the subscriber. When the period expires or if the subscriber calls in earlier to change the service to another line or temporarily cancel the service, the IP 23 will provide cancellation notices to the appropriate central offices 11 and to the SCP 19. In the example, the IP 23 will notify the office $11_1$ to cancel the off-hook trigger set against the line to station $1_A$ and to delete the subscriber's virtual OE number and profile from its disc memory. The IP 23 will also instruct the central office $11_N$ to cancel the terminating attempt trigger set against the subscriber's business line to station $1_B$. The notice to the SCP 19 causes the SCP to deactivate the personal dial tone CPR and the call redirection CPR. If the associated personal identification functionality for caller ID service relies on a central database, such as LIDB, the IP would also instruct that database to temporarily establish a subscriber account record associating the subscriber's name and calling card billing information with the telephone number and a subscriber identifier code.

The subscriber can then or later interact with the IP 23 to establish time based temporary personal dial tone service through another line or location, as discussed above. In this manner, a subscriber might set up a temporary office in a motel in one city for several days. The subscriber might cancel the service while in transit to a new location. Then the subscriber might reestablish the service to set up a temporary office service at a vacation home for a week.

The time based personal dial tone service could be modified in several manners. For example, the subscriber might establish a file for use by the SCP or the IP to establish the personal dial tone service at two or more locations at specified times, e.g. at the office during office hours and at a home office during other hours. Also, the above example of this service relied on downloading the subscriber's profile into the switch serving the line with which the subscriber is temporarily associated. Alternatively, the IP could obtain the profile from the subscriber's home switch and provide the profile to the serving switch as part of the processing of each outgoing call by the subscriber from that line during the specified time period.

A preferred network implementation and a number of specific call processing routines have been discussed above by way of examples relating to the present invention. However, the preferred embodiment of the invention is amenable to a variety of modifications.

Also, the currently preferred embodiment utilizes AIN routing to the IP and speaker identification/verification elements within the IP to identify the subscriber for profile selection. As speaker identification/verification equipment becomes more readily available, cheaper and more compact, it will be possible to build this functionality into the line cards of the end office switches. The switch itself will challenge the caller, analyze spoken information and identify the subscriber to select the appropriate profile, without routing to an IP or the like.

Figure 6:
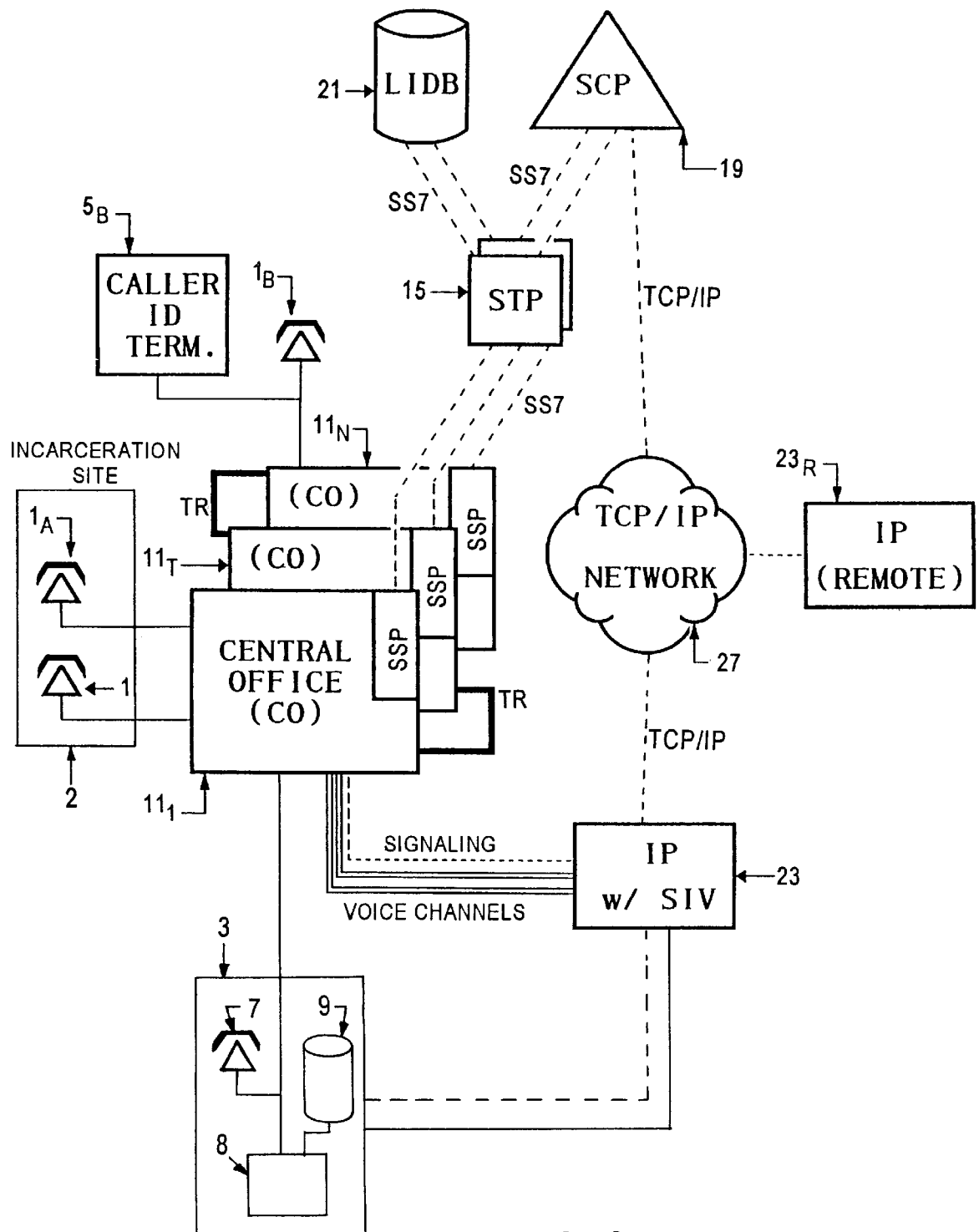
FIG. 6 shows a block diagram of a preferred embodiment of the telephone network shown in FIG. 1, which may be utilized to provide the home incarceration service of the invention.

The foregoing description sets forth the arrangement and functionality of the enhanced telecommunications network of the invention which enable an improved form of home incarceration. Following is a description of an illustrative example of a preferred mode of operation of that system. Referring to FIG. 6 there is shown an amplified version of the network of FIG. 1 wherein like reference numerals refer to like elements. In the arrangement of FIG. 6 the telephone terminals 1 and $1_A$ are located on the premises of an incarceration site 2. The site may constitute the detainee's home, a governmental institution, a half-way house, or the like. In many instances home incarceration services are provided by governmental agencies of a state or county. Alternatively, such services may be provided by private companies for the state or county, as the case may be.

In either event the entity providing the service typically utilizes a supervisory node or incarceration control center, such as that which is shown at 3 in FIG. 6. Such a control center would normally contain a series of telephone terminals for contacting and receiving calls from detainees. Such telephones are represented by the terminal 7 in FIG. 6. The center would also contain a control processor 8 and associated disk storage and database 9. It will be appreciated that at least most of the routine verification calls made and received by the control center are automated in known fashion. The telephone terminal and processor are connected to the central office $11_1$ preferably by an ISDN link, and connected to the IP 23 by a data link.

Assuming that the incarceration site 2 houses four detainees A, B, C, and D, one illustrative example of operation of the system may be described as follows.

The incarcerating authority has established control parameters for each detainee which define the number and frequency of incarceration verification checks to be made daily to insure compliance with the program. These parameters are imparted to the control center 3 and the necessary programming of the control center and telephone facilities is accomplished. In this example it is assumed that the control parameters require verification checks of detainee A a minimum of three times per day with an interval between checks not to exceed eight hours.

During a calendar day when detainee A makes no outgoing telephone calls, the control center 3 will initiate three calls to A commencing at approximately 7 AM. Calls will thus be initiated at approximately 7 AM, 3 PM, and 11 PM. Each of these calls may be made to the telephone number of one of the lines to the telephone terminals 1 and $1_A$ on the incarceration premises.

On an incoming call the network prompts the caller to speak the name of the called party. The network would then recognize the spoken name, the necessary signaling occurs between the telephone, central office switch, signal control point and intelligent peripheral, and the switching office loads the appropriate profile, as described in detail hereinbefore in connection with FIG. 4. The distinctive ringing signal appropriate to the called detainee is sent to the line.

In the case where a verification call is made by the control center the identity of the appropriate profile is known and signaling between the control center and network may replace the voice recognition steps to obtain the desired individualized distinctive ringing signal. Alternatively, the control point may respond to the name query or the prompt by transmitting a prerecorded voice signal of the called detainee.

Assuming the detainee to whom the ringing signal has been assigned responds and picks up the telephone, he/she will be directed to call back the control center. In the return call the calling detainee is directed to speak his/her name and perhaps additional specified words for which the IP has previously prepared templates for the particular detainee. Upon voice verification by the IP the calling detainee may receive a predetermined prompt, such as "Thank you. Goodbye." The call is then terminated.

The network date and time stamps the successful incarceration verification or validation and may make and store a recording of all or part of the dialog. Pertinent data regarding the exchange is periodically reported from the network to the control center. The control center also date and time stamps the call and can correllate the two sets of records to create a complete history of the event. Both the telephone network and the incarcerator control center may utilize the collected data for billing purposes. The Telco may bill the entity operating the control center, and that entity may bill the county or state. Alternatively, the county or state may operate the control center wherein only one billing would be necessary.

In the foregoing example it has been assumed that the called line was available and was not busy. In the event that the line is busy the control center may simply replace the call to the other line to the incarceration site. If both lines are busy the control center can contact the intelligent peripheral over its data link. The intelligent peripheral knows which detainee is a party to the call, and the control center can obtain this information from the IP. In addition, all or a portion of the call may be monitored by the IP. The control center may obtain access to the recording for further verification or downloading if desired. In this manner the system of the invention makes it possible to utilize on-going third party calls for verification or validation purposes. If the presence of the desired detainee can be validated in such a manner it becomes unnecessary for the control center to further pursue that particular validation, thereby simplifying and economizing the incarceration process.

According to another feature of the invention the IP may store a record of the date, time, and line on which a successful match of the name of a detainee has occurred. This information may then be further processed in the IP or forwarded to the control center on a periodic basis. This data may then be utilized to verify periods of time within which the verification requirements of a particular detainee have been satisfied. Such a procedure makes it possible to obviate the necessity of the incarcerating supervising entity to initiate calls to verify incarceration.

If the program for a specific detainee requires verification at least once every eight hours, the occurrence of verification during a third party call may be utilized to shift back the time for the next verification by call from the control center. In this way it is possible to greatly reduce the number of calls from the control center which are required within a sequential twenty-four hour period. The control center receiving a signal that a verification was confirmed at a specific time can slide the scheduled time for the next required call back to take advantage of the validation.

In the event that the detainee which the control center seeks is not a party to either of the ongoing calls on the two incarceration site lines, the control office may interrupt one or both of the calls. The control center may then transmit to the interrupted callers a prearranged signal directing that the call be terminated within a specified amount of time, such as two or three minutes. The termination of the call will free the affected line and the call from the control center to the detainee may then be replaced and corn pleted.

In the foregoing example it has been assumed that the called detainee satisfied the voice authentication procedure. In the event that the name and possible other key word(s) do not find a matching template in the IP on the initial attempt, the IP may prompt for one or more repeat attempts by the called party. If the voice verification is not accomplished in a pre-established maximum number of attempts, the IP may notify the party that the test failed and give default instructions. The IP also provides a failure signal to the control center and activate whatever procedure that the county or state has mandated for such situations.

In typical home incarceration circumstances the detainees would be permitted some limited use of the telephone for personal purposes. Thus a particular detainee might be permitted any local calls but long distance calls may be prohibited. In another case the detainee may be restricted to local calls to a limited number of telephone directory numbers. The system of the invention provides a ready implementation of such restrictions.

Operation is now described in the situation where an originating call is placed by a detainee from the incarceration site.

The detainee lifts the handset creating an off-hook state in the telephone and a corresponding signal or change in state on the line to the central office. In this call flow, the off-hook signal is a service request to make an outgoing call. The serving central office detects the off-hook and commences its call processing. Specifically, the central office assigns a register to this call in the call store 67 and loads profile information associated with the off-hook line from the disc storage 63 into the assigned register. In this case, the central office is an SSP capable office, and the loaded profile data indicates an off-hook immediate trigger set against the particular line. The serving SSP type office therefore detects this off-hook PIC as an AIN trigger.

In response to the off-hook and the off-hook trigger set in the profile, the SSP type central office switch launches a query to the SCP 19. Specifically, the SSP creates a TCAP query message containing relevant information, such as the office equipment (OE) number assigned to the off-hook line, and transmits that query over an SS7 link to one of the STPs 15. The query includes a destination point code and/or a global title translation addressing the message to the SCP 19, and the STP 15 relays the query message over the appropriate link to the SCP 19. The query from the SSP central office identifies the caller's line by its associated office equipment (OE) number.

In response to a query, the SCP 19 accesses its a database, typically, the MSAP database set up in the ISCP, to determine how to process the particular call. The SCP 19 identifies an access key in the query and uses the key to retrieve the appropriate record from the database. In this case, the query indicates an off-hook trigger as the trigger event, therefore the SCP 19 uses the calling party office equipment (OE) number as the access key. The SCP 19 retrieves a call processing record (CPR) corresponding to the office equipment (OE) number associated with the off-hook line and proceeds in accord with that CPR.

For the present example of the personal dial tone service, the CPR will provide information necessary for routing the call to some node of the network that will perform speaker identification/verification (SIV), in this example the IP. Therefore the CPR provides information for routing the call to the nearest available IP having the SIV capability.

Based on the CPR, the SCP 19 formulates a response message instructing the SSP central office serving the line to route the call. In this case, the message includes information, e.g. a office equipment (OE) number or telephone number, used for routing a call to the identified IP 23. The SCP 19 formulates a TCAP message in SS7 format, with the destination point code identifying the SSP office. The SCP 19 transmits the TCAP response message back over the SS7 link to the STP 15, and the STP 15 in turn routes the TCAP message to the SSP central office.

The SSP type switch in the central office 11₁ uses the routing information to connect the call to one of the lines or channels to the IP 23. A two-way voice grade call connection now extends between the calling station and the IP 23. In the present example, the switch actually connects the off-hook line to the line to the IP before providing dial tone to the caller.

As noted above, the communication link to the IP 23 provides both line connections and signaling, preferably over a primary rate interface (PRI) type ISDN link. When the central office extends the call from the calling party's line to a line circuit (over a B channel) to the IP 23, the switch in that office also provides call related data over the signaling link (D channel for ISDN). The call related data, for example, includes the office equipment (OE) number normally associated with the off-hook line and possibly the telephone number for that line.

In response to the incoming call, the IP 23 will seize the line, and it will launch its own query to the SCP 19. In the preferred network illustrated in FIG. 1, the IP 23 and the SCP 19 communicate with each other via a separate second signalling network 27, for example utilizing either an 1129+ protocol or a generic data interface (GDI). The query from the IP 23 again identifies the caller's line by at least its associated office equipment (OE) number.

In response to the query from the IP 23, the SCP 19 again accesses the appropriate CPR and provides a responsive instruction back through the network 27 to the IP 23. Although the IP 23 could passively monitor any speech that the user might utter, the preferred implementation utilizes a 'Challenge Phase' to prompt the detainee to input specific identifying information. In this case, the instruction causes the IP 23 to provide a prompt message over the connection to the caller. Here, the signal to the caller may be a standard dial tone or any other appropriate audio signal. Preferably, the instruction from the SCP 19 causes the IP 23 to provide an audio announcement directing the detainee caller to speak personal information. In one preferred example, the IP plays an audio prompt message asking the caller, 'Please say your full name'. The process may ask for any appropriate key word or phrase identifying information.

The signal received by the IP 23 goes over the lines and through the central office switch(es) for presentation via the off-hook telephone to the calling party (detainee). In response, the caller will speak the identifying information into their off-hook telephone, and the network will transport the audio signal to the IP 23.

When the IP 23 receives speech input information during actual call processing, for this service example, the IP analyzes the speech to extract certain characteristic information.

The IP 23 stores a template or other voice pattern information for each person who has the personal dial tone service in the area that the IP normally services. This would normally include the calling detainee. If the IP 23 does not store the particular template or feature information it needs to process a call, the IP 23 can communicate with a remote IP 23$_R$ to obtain that information. In the present shared line example, the IP 23 will store template or feature data for each subscriber or detainee associated with the particular off-hook line.

When the IP 23 receives input speech and extracts the characteristic information during actual call processing, the IP compares the extracted speech information to stored pattern information, to identity and authenticate the particular caller. In the present example, the voice authentication module 233 in the IP 23 compares the extracted speech information to the stored template or feature data for each subscriber associated with the particular off-hook line.

The IP 23 determines if the information extracted from the speech input matches any of the stored template data feature data for an identifiable subscriber or detainee (within some threshold level of certainty). If there is a match, the IP now knows the identity of the calling subscriber or detainee. Based on the identification of the calling subscriber or detainee, the IP 23 selects a virtual office equipment (OE) number from storage that corresponds to the subscriber or detainee.

The IP 23 formulates a D-channel signaling message containing the virtual office equipment (OE) number together with an instruction to load that OE number into the register assigned to the call in place of the OE number of the off-hook line. The IP 23 supplies the message to the SSP central office switch 11$_1$ over the D-channel of the ISDN PRI link. In response, the administrative module processor 61 rewrites the OE number in the register assigned to the call using the OE number received from the IP 23.

Upon rewriting the OE number in the register, the administrative module processor 61 of central office switch 11$_1$ also reloads the profile information in the register. Specifically, the administrative module processor 61 retrieves profile information associated with the virtual office equipment (OE) number from the disc storage 63 into the register. As such, the profile information in the assigned register in the call store 67 now corresponds to the identified subscriber or detainee, rather than to the off-hook line.

The profile information provides a wide range of data relating to the subscriber or detainee's services. The profile data provides necessary billing information, enabling billing from the call to this particular subscriber or detainee for a personal call and/or billing to the incarceration supervision entity. The profile also defines various service features and restrictions applicable to this subscriber or detainee on outgoing calls, such as three-way calling in the case of an allowed service, and prohibited and/or allowable calls in the case of a detainee. The profile may also include a list of key words for which monitoring is maintained during calls. The profile may define a class of calling service available to the subscriber or detainee. Long distance calls are usually proscribed in the case of detainees. To this end the key word list may contain credit card names and DTMF sequences which precede long distance calls. The profile may also direct that that call be completely monitored or stored.

In the presently preferred implementation, when the central office switch 11$_1$ reloads the profile, the central office disconnects the link to the IP 23 and connects tone receivers to the caller's line. Optionally, the central office may provide a 'dial tone' or other message over the line. The caller now dials digits in the normal manner, and the switch in the central office 11$_1$ loads the dialed digits into the assigned register within the call store 67. The central office 11$_1$ utilizes the dialed digits and the subscriber's profile data to process the call. For example, if the dialed digits represent a call within the subscriber's permitted class of service, the switch completes the call to the destination station using the dialed digits in the normal manner. If the profile data requires a particular billing treatment, e.g. to bill a long distance call to the subscriber, the switch makes the appropriate record and forwards the record to the exchange carrier company's accounting office equipment. In accord with another aspect of the invention, the network provides caller ID data naming the identified subscriber or detainee to the destination station.

The processing to complete the call involves a sequence of steps. Of particular note, some of these steps facilitate delivery of caller ID information to the destination station. The present invention involves delivering caller ID information which corresponds to the identified subscriber or detainee, preferably the subscriber or detainee's name, rather than simply the number of the line or station from which the subscriber or detainee initiates the call.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method comprising:
    for a designated person, generating service profile data for controlling a sequence of operation in a multiple link communication network relating to provision of one or more communication services through the network;
    storing the service profile data for the designated person with other service profile data in the communication network;
    detecting a request to make a call from a predetermined link of the communication network;
    receiving and processing speech signals from a person making said request via the predetermined link to identify the requesting person as said designated person;
    instructing a switching office of the communication network to utilize the service profile data for the designated person for processing of the call from the predetermined link through the network; and
    storing data regarding the identification of said designated person and data regarding said call.

2. A method as in claim 1, wherein the step of instructing the switching office comprises providing a virtual office equipment number for use in retrieving the service profile data for the designated person.

3. A method as in claim 1, wherein the step of receiving and processing speech signals comprises comparing information characteristic of the received speech signals to stored speech characteristic data corresponding to a plurality of subscribers.

4. A method as in claim 1, wherein the communication network comprises a telephone network having a plurality of central offices each of which serves a plurality of communication links.

5. A method as in claim 4, wherein the plurality of communication links comprise telephone lines.

6. A method as in claim 1, including the step of transmitting at least a portion of said stored data to a control node.

7. A method as in claim 1, wherein said stored data includes the identity of said designated person, the date and time and duration of the call.

8. A method as in claim 1, wherein the stored data regarding the identification comprises the approximate time of the identification.

9. A method as in claim 8, wherein the stored data regarding the identification further comprises the identity of said designated person.

10. A method as in claim 9, wherein the stored data regarding the identification provides a verification of home incarceration.

11. A method, comprising:
    identifying one party to a requested communication service as one of a plurality of designated persons;
    using a virtual office equipment number, assigned to the identified one person, to retrieve corresponding profile data from stored profile data for the plurality of designated persons;

providing communication service over a link of a communication network based at least in part on the retrieved profile data; and using a portion of the retrieved profile data to provide an identification of the one person over another link of the communication network.

12. A method as in claim 11, wherein the step of identifying one person comprises analyzing speech information from the one person.

13. A method as in claim 11, wherein the communication service comprises attempting to complete a call from the one identified person through the communication network to said another link, and a terminal coupled to said another link presents the identification of the one person to a called party.

14. A method as in claim 13, wherein the identification of the one person comprises the name of the one person.

15. A method as in claim 14, wherein the step of using data to provide the identification comprises transmitting data representing the name of the one person from the profile data through the communication network to said terminal.

16. A method as in claim 14, wherein the step of using data to provide the identification comprises:

transmitting data representing the identity of the one person to a database;

accessing information in the database to translate the data representing the identity of the one person into data representing the name of the one person; and transmitting the data representing the name of the one person to the terminal.

17. A method as in claim 11, wherein:

the communication network comprises a telephone network having a telephone switching system; and the step of using the virtual office equipment number comprises supplying the virtual office equipment number to the telephone switching system and retrieving the corresponding profile data from storage in the telephone switching system.

18. A method as in claim 11, further comprising the step of creating a record comprising data regarding the identification of the one person.

19. A method as in claim 18, wherein the data regarding the identification of the one person comprises the approximate time of the identification.

20. A method as in claim 19, wherein the data regarding the identification of the one person further comprises the identity of the one person.

21. A method as in claim 20, further comprising verifying home incarceration using the record.

22. A method as in claim 18, wherein the record further comprises data regarding the communication service provided.

23. A telecommunication network comprising:

a central office for processing calls originated over a plurality of communication links, said central office including mass storage containing service profiles of designated users of said communication links; and a peripheral coupled to the central office, said peripheral including a voice authentication module for analyzing speech of a caller from one communication link to identify the caller as a designated person and provide an office equipment number assigned to the identified designated person to the central office, wherein:

the central office retrieves a service profile corresponding to the office equipment number from the mass storage and processes at least one call over a communication link using the retrieved service profile, and the network produces a record, comprising data regarding the identification of the caller as the identified designated person and data regarding said call.

24. A network as in claim 23, wherein the the office equipment number comprises a virtual office equipment number corresponding to the caller.

25. A network as in claim 23, wherein the central office comprises a first telephone switch, and the network further comprises a second telephone switch interconnected to the first telephone switch via a trunk circuit.

26. A network as in claim 25, wherein at least some of the communication links comprise telephone lines.

27. A network as in claim 25, further comprising:

a service control point, remote from the telephone switches, said service control point containing a database of call processing records; and a first signaling network separate from the communication links and trunk circuits for carrying signaling messages between the service control point and the telephone switches.

28. A network as in claim 27, wherein the peripheral includes a communication server facilitating signaling communication between the peripheral and the service control point.

29. A network as in claim 28, further comprising a second signaling network, separate from the communication links, the trunk circuits and the first signaling network coupled between the communication server and the service control point.

30. A network as in claim 29, wherein the peripheral stores characteristic voice feature data relating to a plurality of designated persons, and the peripheral comprises a voice authentication module for comparing characteristic data extracted from speech of the caller to the stored characteristic voice feature data.

31. A network as in claim 30, further comprising a remote peripheral storing characteristic voice feature data relating to another plurality of designated persons, wherein the remote peripheral is coupled to the second signaling network for communication of stored characteristic voice feature data.

32. A network as in claim 29, wherein:

the first signaling network comprises a common channel interoffice signaling network coupled to the telephone switches; and the second signaling network comprises a packet switched data network.

33. A network as in claim 32, wherein:

the common channel interoffice signaling network utilizes signaling system 7 (SS7) protocol; and the packet switched data network utilizes transmission control protocol/Internet protocol (TCP/IP).

34. A method comprising:

for a designated person, generating service profile data for controlling a sequence of operation in a multiple link communication network relating to provision of one or more communication services through the network;

storing the service profile data for the designated person with other service profile data in the communication network;

detecting a request to make a call from a predetermined link of the communication network;

receiving and processing speech signals from a person making said request via the predetermined link to identify the requesting person as said designated person;

instructing a switching office of the communication network to utilize the service profile data for the designated person for processing of the call from the predetermined link through the network, wherein the processing of the call comprises:
(a) processing speech signals occurring during said call to detect predesignated signals, based at least in part on data from the service profile data for the designated person; and
(b) upon detecting one or more of said predesignated speech signals, terminating said call.

35. A method according to claim 34, further comprising the step of storing data regarding said detection of said predesignated speech signals and termination of said call.

36. A method as in claim 34, wherein the step of instructing a switching office comprises providing a virtual office equipment number for use in retrieving the service profile data for the designated person.

37. A method as in claim 34, wherein the step of receiving and processing speech signals comprises comparing information characteristic of the received speech signals to stored speech characteristic data corresponding to a plurality of subscribers.

38. A method as in claim 34, wherein the communication network comprises a telephone network having a plurality of central offices each of which serves a plurality of communication links.

39. A method as in claim 38, wherein the plurality of communication links comprise telephone lines.

40. A method as in claim 34, including the step of transmitting at least a portion of said stored data to a control node.

41. A method comprising:
for a designated person, generating service profile data for controlling a sequence of operation in a multiple link communication network relating to provision of one or more communication services through the network;
storing the service profile data for the designated person with other service profile data in the communication network;
detecting a request to make a call from a predetermined link of the communication network;
receiving and processing speech signals from a person making said request via the predetermined link to identify the requesting person as said designated person;
instructing a switching office of the communication network to utilize the service profile data for the designated person for processing of the call from the predetermined link through the network; and
storing data regarding the identification of said designated person and the approximate time of the identification.

42. A method as in claim 41, including the step of indexing a schedule of verifications for the identified person based at least partially on said identification.

43. A method according to claim 42 wherein said storing is performed by an intelligent peripheral and including the step of transmitting a copy of at least a portion of said data to a control center.

44. A method according to claim 43 wherein said indexing is performed by said control center.

45. A method comprising:
for a designated person, generating service profile data for controlling a sequence of operation in a multiple link communication network relating to provision of one or more communication services through the network;
assigning an office equipment number to the designated person;
storing the service profile data for the designated person with other service profile data in the communication network;
detecting a request to make a call from a predetermined link of the communication network;
receiving and processing signals from a person making said request via the predetermined link to identify the requesting person as said designated person;
providing the office equipment number of the designated person to a switching office of the communication network to retrieve the service profile data for the designated person;
processing the call from the predetermined link through the network based at least in part on data from the retrieved service profile data for the designated person; and
storing data regarding the identification of said designated person and data regarding said call.

46. A method as in claim 45, wherein the office equipment number assigned to the designated person comprises a virtual office equipment number.

47. A method comprising:
for a designated person, generating service profile data for controlling a sequence of operation in a multiple link communication network relating to provision of one or more communication services through the network;
assigning an office equipment number to the designated person;
storing the service profile data for the designated person with other service profile data in the communication network;
detecting a request to make a call from a predetermined link of the communication network;
receiving and processing signals from a person making said request via the predetermined link to identify the requesting person as said designated person;
providing the office equipment number of the designated person to a switching office of the communication network to retrieve the service profile data for the designated person;
processing the call from the predetermined link through the network based at least in part on data from the retrieved service profile data for the designated person,
wherein the processing of the call comprises:
(a) processing speech signals occurring during said call to detect predesignated signals, based at least in part on data from the service profile data for the designated person; and
(b) upon detecting one or more of said predesignated speech signals, terminating said call.

48. A method as in claim 47, wherein the office equipment number assigned to the designated person comprises a virtual office equipment number.

* * * * *